(12) United States Patent
Hu et al.

(10) Patent No.: US 10,852,190 B2
(45) Date of Patent: *Dec. 1, 2020

(54) APPARATUS, SYSTEMS, AND METHODS FOR ON-CHIP SPECTROSCOPY USING OPTICAL SWITCHES

(71) Applicant: Massachusetts Institute of Technology, Cambridge, MA (US)

(72) Inventors: Juejun Hu, Newton, MA (US); Tian Gu, Fairfax, VA (US); Hongtao Lin, Somerville, MA (US); Derek Kita, Cambridge, MA (US); Anuradha M. Agarwal, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,142

(22) Filed: Jul. 9, 2019

(65) Prior Publication Data
US 2019/0331529 A1 Oct. 31, 2019

Related U.S. Application Data

(63) Continuation of application No. 15/986,098, filed on May 22, 2018, now Pat. No. 10,386,237, which is a
(Continued)

(51) Int. Cl.
*G01J 3/453* (2006.01)
*G02F 1/313* (2006.01)
(Continued)

(52) U.S. Cl.
CPC ........... *G01J 3/4531* (2013.01); *G01J 3/0218* (2013.01); *G02F 1/313* (2013.01); *G02F 1/3136* (2013.01); *G02F 2001/311* (2013.01)

(58) Field of Classification Search
CPC .... G01J 3/45; G01J 3/08; G01J 3/4531; G01J 3/0218; G02B 6/12; G01B 9/02028
See application file for complete search history.

(56) References Cited

U.S. PATENT DOCUMENTS

D262,419 S  12/1981 Cramer
4,969,742 A  11/1990 Falk et al.
(Continued)

OTHER PUBLICATIONS

"Optical channel monitor based on planar lightwave circuit technology," Enablence, Ottawa, ON, Canada, Tech. Rep., (2010): 1-4.
(Continued)

*Primary Examiner* — David P Porta
*Assistant Examiner* — Meenakshi S Sahu
(74) *Attorney, Agent, or Firm* — Smith Baluch LLP

(57) ABSTRACT

A spectrometer includes an interferometer having a first interference arm and a second interference arm to produce interference patterns from incident light. At least one of the interference arms includes a series of cascaded optical switches connected by two (or more) waveguides of different lengths. Each optical switch directs the incident light into one waveguide or another, thereby changing the optical path length difference between the first interference arm and the second interference arm. This approach can be extended to multi-mode incident light by placing parallel interferometers together, each of which performs spectroscopy of one single mode in the multi-mode incident light. To maintain the compactness of the spectrometer, adjacent interferometers can share one interference arm.

19 Claims, 10 Drawing Sheets

Related U.S. Application Data continuation of application No. 15/429,321, filed on Feb. 10, 2017, now Pat. No. 10,006,809.

(60) Provisional application No. 62/293,399, filed on Feb. 10, 2016.

(51) Int. Cl.
*G01J 3/02* (2006.01)
*G02F 1/31* (2006.01)

(56) References Cited

U.S. PATENT DOCUMENTS

| | | | |
|---|---|---|---|
| 5,044,715 | A | 9/1991 | Kawachi et al. |
| 5,644,125 | A | 7/1997 | Wobschall |
| 5,814,565 | A | 9/1998 | Reichert et al. |
| 6,205,279 | B1 | 3/2001 | Kim et al. |
| 6,370,422 | B1 | 4/2002 | Richards-Kortum et al. |
| 6,925,220 | B2 | 8/2005 | Mukai |
| 6,947,631 | B2 | 9/2005 | Arai et al. |
| 6,975,781 | B2 | 12/2005 | Takiguchi et al. |
| 7,151,599 | B2 | 12/2006 | Islam et al. |
| 7,251,406 | B2 | 7/2007 | Luo et al. |
| 7,301,624 | B2 | 11/2007 | Talley et al. |
| 7,359,593 | B2 | 4/2008 | Little |
| 7,361,501 | B2 | 4/2008 | Koo et al. |
| 7,400,798 | B2 | 7/2008 | De Almeida et al. |
| 7,864,321 | B2 | 1/2011 | Caron et al. |
| 8,098,379 | B2 | 1/2012 | Okamoto |
| 8,116,602 | B2 | 2/2012 | Little et al. |
| 8,121,450 | B2 | 2/2012 | Webster et al. |
| 8,297,128 | B2 | 10/2012 | Delbos et al. |
| D677,185 | S | 3/2013 | Zhou et al. |
| 8,406,580 | B2 | 3/2013 | Takada et al. |
| 8,545,759 | B2 | 10/2013 | Niazi |
| 8,615,324 | B2 | 12/2013 | West |
| 8,640,560 | B2 | 2/2014 | Burke |
| 8,718,981 | B2 | 5/2014 | Bey et al. |
| 8,809,765 | B2 | 8/2014 | Weisshaar et al. |
| 8,971,672 | B2 | 3/2015 | Diemeer et al. |
| D748,510 | S | 2/2016 | Zhou et al. |
| 9,529,158 | B2 | 12/2016 | Sorger et al. |
| 9,618,699 | B2 | 4/2017 | Tummidi et al. |
| 9,816,935 | B2 | 11/2017 | Peumans et al. |
| 10,006,809 | B2* | 6/2018 | Hu .................. G02F 1/3136 |
| 10,054,546 | B2 | 8/2018 | Stievater et al. |
| 10,386,237 | B2 | 8/2019 | Hu et al. |
| 2002/0159684 | A1 | 10/2002 | Sun et al. |
| 2003/0048991 | A1 | 3/2003 | Gonthier |
| 2004/0001671 | A1 | 1/2004 | Liu et al. |
| 2004/0131310 | A1 | 7/2004 | Walker |
| 2005/0123244 | A1 | 6/2005 | Block et al. |
| 2005/0248758 | A1 | 11/2005 | Carron et al. |
| 2006/0166302 | A1 | 7/2006 | Clarke et al. |
| 2006/0170931 | A1 | 8/2006 | Guo et al. |
| 2006/0233504 | A1 | 10/2006 | Hochberg et al. |
| 2007/0013908 | A1 | 1/2007 | Lee et al. |
| 2007/0237457 | A1 | 10/2007 | Davis et al. |
| 2009/0219525 | A1 | 9/2009 | Marcus et al. |
| 2010/0017159 | A1 | 1/2010 | Burke |
| 2011/0116741 | A1 | 5/2011 | Cevini et al. |
| 2011/0125078 | A1 | 5/2011 | Denison et al. |
| 2011/0189050 | A1 | 8/2011 | Schlereth et al. |
| 2012/0215073 | A1 | 8/2012 | Sherman et al. |
| 2012/0242993 | A1 | 9/2012 | Schick et al. |
| 2013/0046357 | A1 | 2/2013 | Neev |
| 2013/0071850 | A1 | 3/2013 | Duer |
| 2013/0259747 | A1 | 10/2013 | Lee et al. |
| 2013/0321816 | A1 | 12/2013 | Dattner et al. |
| 2013/0328866 | A1 | 12/2013 | Woodgate et al. |
| 2014/0092385 | A1* | 4/2014 | Nitkowski ............... G01J 3/18 356/326 |
| 2014/0098371 | A1 | 4/2014 | Sabry et al. |
| 2014/0375999 | A1 | 12/2014 | Okamoto |
| 2015/0010994 | A1 | 1/2015 | Rao et al. |
| 2015/0116721 | A1 | 4/2015 | Kats et al. |
| 2015/0146203 | A1 | 5/2015 | Lai et al. |
| 2016/0305797 | A1 | 10/2016 | Pietrasik et al. |
| 2017/0227399 | A1 | 8/2017 | Hu et al. |
| 2018/0011249 | A1 | 1/2018 | Zhu et al. |
| 2018/0140172 | A1 | 5/2018 | Hu et al. |
| 2018/0274981 | A1* | 9/2018 | Hu .................. G01J 3/0218 |
| 2019/0049300 | A1 | 2/2019 | Gu et al. |

OTHER PUBLICATIONS

Abaya, T. V. F. et al., "Characterization of a 3D optrode array for infrared neural stimulation," Biomedical Optics Express, 3(9): 2200-2219 (2012).

Aggarwal, "What's fueling the biotech engine—2010 to 2011." Nature biotechnology 29.12 (2011): 1083. 7 pages.

Akca et al., "Miniature spectrometer and beam splitter for an optical coherence tomography on a silicon chip," Optics Express, vol. 21, No. 14, (2013): 16648-16656.

Ako et al., "Electrically tuneable lateral leakage loss in liquid crystal clad shallow-etched silicon waveguides," Optics Express, vol. 23, No. 3, (2015): 2846-2856.

Babin et al., "Digital optical spectrometer-on-chip," Applied Physics Letters, vol. 95, No. 4, (2009): 1-4.

Bao et al., "A colloidal quantum dot spectrometer," Nature, vol. 523, (2015): 67-70.

Bauters et al., "Planar waveguides with less than 0.1 dB/m propagation loss fabricated with wafer bonding," Optics Express, vol. 19, No. 24, (2011): 24090-24101.

Birch et al., "An Updated Edlen Equation for the Refractive Index of Air," Metrologia, vol. 30, (1993): 155-162.

Birks et al. "The Photonic Lantern," Advances in Optics and Photonics, vol. 7, No. 2, (2015): 107-167.

Bock et al., "Subwavelength grating periodic structures in silicon-on-insulator: a new type of microphotonic waveguide." Optics express 18.19 (2010): 20251-20262.

Bogaerts et al., "Silicon-on-Insulator Spectral Filters Fabricated With CMOS Technology," IEEE Journal of Selected Topics in Quantum Electron, vol. 16, No. 1, (2010): 33-44.

Bogaerts et al., Silicon microring resonators. Laser & Photon. Rev. 2012, 6: 47-73. doi:10.1002/lpor.201100017.

Brouckaert et al., Planar Concave Grating Demultiplexer on a Nanophotonic Silicon-on-Insulator Platform, LEOS 2006—19th Annual Meeting of the IEEE Lasers and Electro-Optics Society, Montreal, Que., 2006, pp. 312-313. doi: 10.1109/LEOS.2006.279091.

Carmon et al., "Dynamical thermal behavior and thermal self-stability of microcavities," Optics Express, vol. 12, No. 20, (2004): 654-656.

Chao et al., "Compact Liquid Crystal Waveguide Based Fourier Transform Spectrometer for In-Situ and Remote Gas and Chemical Sensing," Proc. of SPIE, vol. 6977, (2008): 1-11.

Cheben et al. "A high-resolution silicon-on-insulator arrayed waveguide grating microspectrometer with sub-micrometer aperture waveguides," Optics Express, vol. 15, No. 5, (2007): 2299-2306.

Chen et al., "Heterogeneously Integrated Silicon Photonics for the Mid-Infrared and Spectroscoping Sensing," ACS Nano, vol. 8, No. 7, (2014): 6955-6961.

Civitci et al., "Planar Prism Spectrometer based on Adiabatically Connected Waveguiding Slabs," Optics Communications, vol. 365, (2016): 29-37.

Coarer et al., "Wavelength-scale stationary-wave integrated Fourier transform spectrometry," Nature Photonics, vol. 1, No. 8, (2007): 473-478.

Dalir, H. et al., "Spatial mode multiplexer/demultiplexer based on tapered hollow waveguide," IEICE Electronics Express, 8(9): 684-688 (2011).

DeCorby et al., "Chip-scale spectrometry based on tapered hollow Bragg waveguides," Optics Express, vol. 17, No. 19, (2009): 16632-16645.

Deutsch et al., "High-resolution miniature FTIR spectrometer enabled by a large linear travel MEMS pop-up mirror," Proc. of SPIE, vol. 7319, (2009): 1-8.

(56) References Cited

OTHER PUBLICATIONS

Dewan "Process Analytical Technologies for Pharmaceuticals: Global Markets," 2018. 263 pages.
Dewan, "Single Use Technology for Biopharmaceuticals: Global Markets," 2017. 163 pages.
Dhakal et al., "Nanophotonic waveguide enhanced Raman spectroscopy of biological submonolayers." ACS Photonics 3.11 (2016): 2141-2149.
Ding, Y. et al., "On-chip two-mode division multiplexing using tapered directional coupler-based mode multiplexer and demultiplexer," Optics Express, 21(8): 10376-10382 (2013).
Dong et al., "Nano-Silicon-Photonic Fourier Transform Infrared (FTIR) Spectrometer-on-aChip," Optical Society of America, vol. 1, (2015): 3-4.
Dorrer et al., "RF spectrum analysis of optical signals using nonlinear optics." Journal of lightwave technology 22.1 (2004): 266. 9 pages.
Du et al., "Low-loss photonic device in Ge—Sb—S chalcogenide glass," Optics Letters, vol. 41, No. 13, (2016): 3090-3093.
Dumais et al., "2×2 Multimode Interference Coupler with Low Loss Using 248 nm Photolithography," Optical Society of America, (2016): 19-21.
Evans et al., "TiO2 nanophotonic sensors for efficient integrated evanescent Raman spectroscopy." ACS Photonics 3.9 (2016): 1662-1669.
Fisher, "Going with the flow: continuous manufacturing," Pharmaceutical Technology, Jan. 22, 2012. 24 pages.
Florjanczyk et al., "Multiaperture planar waveguide spectrometer formed by arrayed Mach-Zehnder interferometers," Optics Express, vol. 15, No. 26, (2007): 18176-18189.
Food and Drug Administration, and Process Analytical Technology Initiative. "Guidance for Industry PAT-A Framework for Innovative Pharmaceutical development." Manufacturing and Quality Assurance (2004). 19 pages.
Gan et al., "A high-resolution spectrometer based on a compact planar two dimensional photonic crystal cavity array," Applied Physics Letters, vol. 100, No. 23, (2012): 1-4.
Gehm et al., "Static two-dimensional aperture coding for multimodal, multiplex spectroscopy," Applied Optics, vol. 45, No. 13, (2006): 2965-2974.
Guideline, ICH Harmonised Tripartite. "Pharmaceutical development." Q8. Current Step 4 (2009). 11 pages.
Harris et al., "Efficient, compact and low loss thermo-optic phase shifter in silicon," Optics Express, vol. 22, No. 9, (2014): 83-85.
Herres et al.,"Understanding FT-IR Data Processing," Part 1: Data Acquistion and Fourier Transformation (1984): 352-356.
Herriott et al., "Folded Optical Delay Lines," Applied Optics, vol. 4, No. 8, (1965): 883-889.
Holmstrom et al., "Trace gas Raman spectroscopy using functionalized waveguides." Optica 3.8 (2016): 891-896.
Hu et al., "Cavity-Enhanced Infrared Absorption in Planar Chalcogenide Glass Microdisk Resonators: Experiment and Analysis," Journal of Lightwave Technology, vol. 27, No. 23 (2009): 5240-5245.
Hu et al., Angled multimode interferometer for bidirectional wavelength division (de)multiplexing. R Soc Open Sci. Oct. 21, 2015;2(10):150270. doi: 10.1098/rsos.150270. eCollection Oct. 2015.
Hu, "Ultra-sensitive chemical vapor detection using microcavity photothermal spectroscopy," Optics Express, vol. 18, No. 21, (2010): 22174-22186.
Hung et al., Narrowband Reflection From Weakly Coupled Cladding-Modulated Bragg Gratings, in IEEE Journal of Selected Topics in Quantum Electronics, vol. 22, No. 6, pp. 218-224, Nov.-Dec. 2016, Art No. 4402507. doi: 10.1109/JSTQE.2015.2487878.
International Search Report and Written Opinion dated Jun. 9, 2017 from International Application No. PCT/US17/17349, 30 pages.
International Search Report and Written Opinion in PCT/US2018/045859 dated Nov. 2, 2018. 14 pages.
International Search Report and Written Opinion dated Oct. 6, 2016 for International Application No. PCT/US16/43488, 17 pages.

Wilkes et al., "60 dB high-extinction auto-configured Mach-Zehnder interferometer." Optics letters 41.22 (2016): 5318-5321.
Wilkings, "Disposable bioreactor sensors play catch-up." Bioprocess Int, Westborough 56 (2011). 4 pages.
Xia et al., "High resolution on-chip spectroscopy based onminiaturized microdonut resonators," Optics Express, vol. 19, No. 13, (2011): 12356-12364.
Xu et al., "High speed silicon Mach-Zehnder modulator based on interleaved PN junctions," Optical Express, vol. 20, No. 14, (2012): 15093-15099.
Xu et al., "Multimodalmultiplex spectroscopy using photonic crystals," Optical Express, vol. 11, No. 18, (2003): 2126-2133.
Yu, "Continuous manufacturing has a strong impact on drug quality." FDA Voice 12, Apr. 13, 2016. 5 pages.
Zhang et al., "A compact and low loss Y-junction for submicron silicon waveguide," Optical Express, vol. 21, No. 1, (2013): 1310-1316.
Jiang et al., "Wavelength and bandwidth-tunable silicon comb filter based on Sagnac loop mirrors with Mach-Zehnder interferometer couplers," Optics Express, vol. 24, No. 3, (2016): 2183-2188.
Kita et al., "High-performance and scalable on-chip digital Fourier transform spectroscopy." Nature communications 9.1 (2018): 4405. 7 pages.
Kita et al., "On-Chip Infrared Spectroscopic Sensing: Redefining the Benefits of Scaling," in IEEE Journal of Selected Topics in Quantum Electronics, vol. 23, No. 2, pp. 340-349, Mar.-Apr. 2017, Art No. 5900110. doi: 10.1109/JSTQE.2016.2609142.
Klutz et al., "Developing the biofacility of the future based on continuous processing and single-use technology." Journal of biotechnology 213 (2015): 120-130.
Koonen, A. M. J. et al., "Silicon Photonic Integrated Mode Multiplexer and Demultiplexer," IEEE Photonics Technology Letters, 24(21): 1961-1964 (2012).
Kraft et al., "MEMS-based Compact FT-Spectrometers—A Platform for Spectroscopic Mid-Infrared Sensors," Sensors (2008): 1-4.
Kuczewski et al., "A single-use purification process for the production of a monoclonal antibody produced in a PER. C6 human cell line." Biotechnology journal 6.1 (2011): 56-65.
Kyotoku et al.,"Sub-nm resolution cavity enhanced microspectrometer." Optics Express, vol. 18, No. 1, (2010): 102-107.
Lee et al., "In situ bioprocess monitoring of *Escherichia coli* bioreactions using Raman spectroscopy." Vibrational Spectroscopy 35.1-2 (2004): 131-137.
Lee et al., "Modernizing pharmaceutical manufacturing: from batch to continuous production." Journal of Pharmaceutical Innovation 10.3 (2015): 191-199.
Lee, "Modernizing the Way Drugs Are Made: A Transition to Continuous Manufacturing." Retrieved from FDA: https://www.fda.gov/Drugs/NewsEvents/ucm557448.htm (2017). 3 pages.
Lee, C.-K. et al., "Light field acquisition using wedge-shaped waveguide," 2013 IEEE International Conference on Consumer Electronics (ICCE), pp. 228-229.
Levine et al., "Efficient, flexible facilities for the 21st century." BioProcess Int 10.11 (2012): 20-30.
Lin et al., "Double resonance 1-D photonic crystal cavities for single-molecule mid-infrared photothermal spectroscopy: theory and design," Optics Letter, vol. 37, No. 8, (2012): 1304-1306.
Ma et al., "CMOS-Compatible Integrated Spectrometer Based on Echelle Diffraction Grating and MSM Photodetector Array." Photonics Journal, vol. 5, No. 2, (2013): 6600807-6600807.
Martens et al., "Compact Silicon Nitride Arrayed Waveguide Gratings for Very Near-Infrared Wavelengths," in IEEE Photonics Technology Letters, vol. 27, No. 2, pp. 137-140, 15 Jan. 15, 2015. doi: 10.1109/LPT.2014.2363298.
Miller, "Perfect optics with imperfect components." Optica 2.8 (2015): 747-750.
Momeni et al., "Integrated photonic crystal spectrometers for sensing applications," Optics Communications, vol. 282, No. 15, (2009): 3168-3171.
Nedeljkovic et al., "Mid-Infrared Silicon-on-Insulator Fourier-Transform Spectrometer Chip," IEEE Photonics Technology Letters, vol. 28, No. 4, (2016): 528-531.

(56) References Cited

OTHER PUBLICATIONS

Nitkowski et al., "Cavity-enhanced on on-chip absorption spectroscopy using microring resonators," Optics Express, vol. 16, No. 16, (2008): 11930-11936.

Nitkowski et al., "On-chip spectrophotometry for bioanalysis using microring resonators," Biomedical Optics Express, vol. 2, No. 2, (2011): 271-277.

Overton, "How spectrometers have shrunk and grown since 2010," Laser Focus World, vol. 52, No. 2, (2016): 35-41.

Pathak et al., "Comparison of AWGs and Echelle Gratings for Wavelength Division Multiplexing on Silicon-on-Insulator," in IEEE Photonics Journal, vol. 6, No. 5, pp. 1-9, Oct. 2014, Art No. 4900109. doi: 10.1109/JPHOT.2014.2361658.

Petit et al., "Compositional dependence of the nonlinear refractive index of new germanium-based chalcogenide glasses," Journal of Solid State Chemistry, vol. 182, No. 10, (2009): 2756-2761.

Pisanello, F. et al., "Multipoint-Emitting Optical Fibers for Spatially Addressable In Vivo Optogenetics," Neuron, 82 (6): 1245-1254 (2014).

Redding et al., "All-fiber spectrometer based on speckle pattern reconstruction," Optics Express, vol. 21, No. 5, (2013): 6584-6600.

Redding et al., "Compact spectrometer based on a disordered photonic chip," Nature Photonics, vol. 7, No. 9, (2013): 746-751.

Redding et al., "Using a multimode fiber as a high-resolution, low-loss spectrometer," Optics Letters, vol. 37, No. 16, (2012): 3384-3386.

Reyes et al., "A novel method of creating a surface micromachined 3D optical assembly for MEMS-based miniaturized FTIR spectrometers," Proc. of SPIE, vol. 6888, (2008): 1-8.

Robinson et al., "First-principle derivation of gain in high-index-contrast waveguides," Optics Express, vol. 16, No. 21, (2008): 16659-16669.

Roelkens et al., "Silicon-based heterogeneous photonic integrated circuits for the mid-infrared," Optical Materials Express, vol. 3, No. 9, (2013): 1523-1536.

Schuler et al., "MEMS-based microspectrometer technologies for NIR and MIR wavelengths," Journal of Physics D: Applied Physics, vol. 42, No. 13, (2009): 1-13.

Sellar et al., "Comparison of relative signal-to-noise ratios of different classes of imaging spectrometer," Applied Optics, vol. 44, No. 9, (2005): 1614-1624.

Sharpe et al., "Gas-phase databases for quantitative infrared spectroscopy," Applied Spectroscopy, vol. 58, No. 12, (2004): 1452-1461.

Shiryaev et al., "Preparation of optical fibers based on Ge—Sb—S glass system," Optical Materials, vol. 32, No. 2, (2009): 362-367.

Singh et al., "Raman spectroscopy of complex defined media: biopharmaceutical applications." Journal of Raman Spectroscopy 46.6 (2015): 545-550.

Singh et al., "Mid-infrared materials and devices on a Si platform for optical sensing," Sciencce and Technology of Advanced Materials, vol. 15, No. 1, (2014): 1-15.

Smith et al., "Sensing nitrous oxide with QCL-coupled siliconon-sapphire ring resonators," Optics Express, vol. 23, No. 5, (2015): 5491-5499.

Soole et al., "Monolithic InP/InGaAsP/InP grating spectrometer for the 1.48-1.56µm wavelength range," Applied Physics Letters, vol. 58, No. 18, (1991): 1949-1951.

Stark, E. et al., "Diode probes for spatiotemporal optical control of multiple neurons in freely moving animals," J Neurophysiol, 108(1): 349-363 (2012).

Stevens et al., Developing fibre optic Raman probes for applications in clinical spectroscopy. Chem Soc Rev. Apr. 7, 2016;45(7):1919-34. doi: 10.1039/c5cs00850f. Epub Mar. 9, 2016. Review. PubMed PMID: 26956027.

Subramanian et al., "Silicon and silicon nitride photonic circuits for spectroscopic sensing on-a-chip." Photonics Research 3.5 (2015): B47-B59.

Szymanski, Raman spectroscopy: theory and practice. Springer Science & Business Media, 2012.

Tamazin et al., "Ultra-broadband Compact Adiabatic Coupler in Silicon-on-Insulator for Joint Operation in the C-and O-Bands." CLEO: Science and Innovations. Optical Society of America, 2018. 2 pages.

Travis, A. et al., "Collimated light from a waveguide for a display backlight," Optics Express, 17(22): 19714-19719 (2009).

Travis, A. R. L. et al., "Wedge Optics in Flat Panel Displays," Proceedings of the IEEE, 101(1): 45-60 (2013).

Wan et al., "High-resolution optical spectroscopy using multimode interference in a compact tapered fibre," Nature Communications, vol. 6, (2015): 1-6.

Wang et al., "Polarization-Independent Mode-Evolution-Based Coupler for the Silicon-on-Insulator Platform." IEEE Photonics Journal 10.3 (2018): 1-10.

Wen et al., "All-optical switching of a single resonance in silicon ring resonators," Optics Letters, vol. 36, No. 8, (2011): 1413-1415.

* cited by examiner

APPARATUS, SYSTEMS, AND METHODS FOR ON-CHIP SPECTROSCOPY USING OPTICAL SWITCHES

CROSS-REFERENCES TO RELATED APPLICATION(S)

This application is a continuation of U.S. application Ser. No. 15/986,098, filed May 22, 2018, entitled "Apparatus, Systems, and Methods for On-Chip Spectroscopy Using Optical Switches," which is a continuation of U.S. application Ser. No. 15/429,321, now U.S. Pat. No. 10,006,809, filed Feb. 10, 2017, and entitled "Apparatus, Systems, and Methods for On-Chip Spectroscopy Using Optical Switches," which in turn claims priority to U.S. Application No. 62/293,399, filed Feb. 10, 2016, and entitled "METHODS AND SYSTEMS FOR ON-CHIP SPECTROMETRY." Each of these applications is hereby incorporated herein by reference in its entirety for all purposes.

BACKGROUND

A spectrometer is an instrument that quantifies the spectral power density of a polychromatic optical input. Existing spectrometers generally fall into two categories: spectrum splitting spectrometers and Fourier Transform InfraRed (FTIR) spectrometers. A typical spectrum splitting spectrometer spectrally splits the polychromatic input into different channels using a dispersive element (e.g., a diffraction grating, a prism, or a random scattering medium) and then measures the spectral density at each channel. In contrast, an FTIR spectrometer usually employs an interferometer with a variable arm path length to extract the spectral density from an interferogram. Compared to spectrum splitting spectrometers, F spectrometers can offer enhanced signal-to-noise ratio (SNR), since the optical input is not split into multiple channels. This advantage is also referred to as the Fellgett advantage or the multiplex advantage.

Conventional FTIR spectrometers usually include discrete optical elements, such as gratings, prisms, and beam splitters, and therefore can be bulky and costly. These challenges may be addressed by on-chip spectrometers developed by photonic integration technologies. Most on-chip spectrometers are based on spectrum splitting using arrayed waveguide gratings, Echelle gratings, micro-resonators, random scattering medium, or a combination of these dispersive elements. As a result, these on-chip spectrometers usually lack the Fellgett advantage.

Photonic integration technologies can also be used in on-chip F spectrometer, e.g., to realize the arm path length change either by microelectromechanical systems (MEMS) tuning, electro-optic, or thermo-optic tuning. MEMS tuning typically uses mechanical moving parts that can increase complexity of the resulting system and can compromise system robustness. Electro-optic and thermo-optic tuning normally do not use moving parts to change arm path lengths, but the tuning range in these techniques can also be limited, thereby compromising the performance of the resulting spectrometers.

For example, in the near-infrared regime, liquid crystal waveguides can offer a maximum effective index tuning range (e.g., on the order of $10^{-2}$). With 10 cm long waveguide, this tuning range of refractive index can provide a spectral resolution of about 10 cm$^{-1}$. However, the long waveguide length can also increase the device power consumption for tuning. In addition, in the mid-infrared regime (e.g., 2.5 µm<$\lambda$<25 µm), liquid crystals can become opaque and electro-optic tuning can provide only a small $\Delta$n (e.g., up to $10^{-3}$). An alternative to electro-optic tuning can be thermo-optical tuning, but thermos-optical tuning can introduce undesirable blackbody thermal radiation noise. Accordingly, the spectral resolution can deteriorate to an even lower value of about 100 cm$^{-1}$ for a 10 cm-long interferometer. The apparent trade-off between spectral resolution, device footprint, and power consumption therefore imposes a challenge in developing new spectrometers.

SUMMARY

Apparatus, systems, and methods described herein are generally related to Fourier transform spectroscopy. In one example, a spectrometer includes a beam splitter to split incident light into a first portion and a second portion. The spectrometer also includes a first interference arm and a second interference arm. The first interference arm is in optical communication with the beam splitter to receive the first portion of the incident light. The first interference arm includes a first optical switch switchable between a first state and a second state, a first reference waveguide having a first optical path length $L_1$ to receive the first portion of the incident light when the first optical switch is in the first state, and a first variable waveguide having a second optical path length $L_2$, different than the first optical path length $L_1$, to receive the first portion of the incident light when the first optical switch is in the second state. The second interference arm is in optical communication with the beam splitter to receive the second portion of the incident light. The spectrometer also includes a detector, in optical communication with the first interference arm and the second interference arm, to detect interference of the first portion of the incident light from the first interference arm and the second portion of the incident light from the second interference arm.

In another example, a method includes splitting incident light into a first portion and a second portion. The method also includes coupling the first portion of the incident light in a first interference arm and coupling the second portion of the incident light in a second interference arm. The first interference arm includes a first optical switch, a first reference waveguide having a first optical path length $L_1$, and a first variable waveguide having a second optical path length $L_2$ different than the first optical path length $L_1$. The method also includes actuating the first optical switch to couple the first portion of the incident light through the first reference waveguide so as to generate a first optical path difference between the first interference arm and the second interference arm, and detecting first interference between the first portion of the incident light and the second portion of the incident light when the first portion of the incident light is guided through the first reference waveguide. The method also includes actuating the first optical switch to couple the first portion of the incident light through the first variable waveguide so as to generate a second optical path difference between the first interference arm and the second interference arm and detecting second interference between the first portion of the incident light and the second portion of the incident light when the first portion of the incident light is guided through the first variable waveguide.

In yet another example, a Fourier transform spectrometer includes a beam splitter to split the incident light into a first portion and a second portion. The spectrometer also includes a first interference arm and a second interference arm. The first interference arm is in optical communication with the beam splitter, to receive the first portion of the incident light. The first interference arm includes j/2 optical switches, where j is an even integer. Each optical switch in the j/2 optical switches is switchable between a first state and a second state. The first interference arm also includes j/2 reference waveguides, where an nth reference waveguide in the j/2 reference waveguides receives the first portion of the incident light when an nth optical switch in the j/2 optical switches is in the first state, where n=1, 2, . . . , j/2. The first interference arm also includes j/2 variable waveguides, where an nth variable waveguide in the j/2 variable waveguides receiving the first portion of the incident light when the nth optical switch in the j/2 optical switches is in the second state. The second interference arm, in optical communication with the beam splitter to receive the second portion of the incident light. The second interference arm includes j/2 optical switches and each optical switch in the j/2 optical switches is switchable between the first state and the second state. The second interference arm also includes j/2 reference waveguides and an mth reference waveguide in the j/2 reference waveguides receives the second portion of the incident light when an mth optical switch in the j/2 optical switches is in the first state, where m=1, 2, . . . , j/2. The second interference arm also includes j/2 variable waveguides and an mth variable waveguide in the j/2 variable waveguides receiving the second portion of the incident light when the mth optical switch in the j/2 optical switches is in the second state. The spectrometer also includes a beam combiner that further includes a first input port to receive the first portion of the incident light from the first interference arm, a second input port to receive the second portion of the incident light from the second interference arm, a first output port to deliver a first output, and a second output port to deliver a second output. The spectrometer further includes a first detector, in optical communication with the first port of the beam combiner, to detect the first output, and a second detector, in optical communication with the second port of the beam combiner, to detect the second output.

In yet another example, a spectrometer includes a mode transformer to receive incident light and split the incident light into a first spatial mode and a second spatial mode. The spectrometer also includes a first interferometer to receive the first spatial mode and a second interferometer to receive the second spatial mode. The first interferometer includes a first beam splitter to receive the first spatial mode and split the first spatial mode into a first portion and a second portion. The first interferometer also includes a first interference arm, in optical communication with the first beam splitter, to receive the first portion of the first spatial mode. The first interference arm includes a first optical switch switchable between a first state and a second state, a first reference waveguide having a first optical path length $L_1$ to receive the first portion of the incident light when the first optical switch is in the first state, and a first variable waveguide having a second optical path length $L_2$, different than the first optical path length $L_1$, to receive the first portion of the incident light when the first optical switch is in the second state. The first interferometer also includes a second interference arm, in optical communication with the first beam splitter, to receive the second portion of the incident light. The first interferometer further includes a first detector, in optical communication with the first interference arm and the second interference arm, to detect first interference of the first portion of the first spatial mode from the first interference arm and the second portion of the first spatial mode from the second interference arm. The second interferometer includes a second beam splitter to receive the second spatial mode and split the second spatial mode into a third portion and a fourth portion. The second interferometer also includes a third interference arm to receive the third portion of the second spatial mode and the first interference arm to receive the fourth portion of the second spatial mode. The second interferometer further includes a second detector, in optical communication with the first interference arm and the third interference arm, to detect second interference of the third portion of the second spatial mode from the third interference arm and the fourth portion of the second spatial mode from the first interference arm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1:
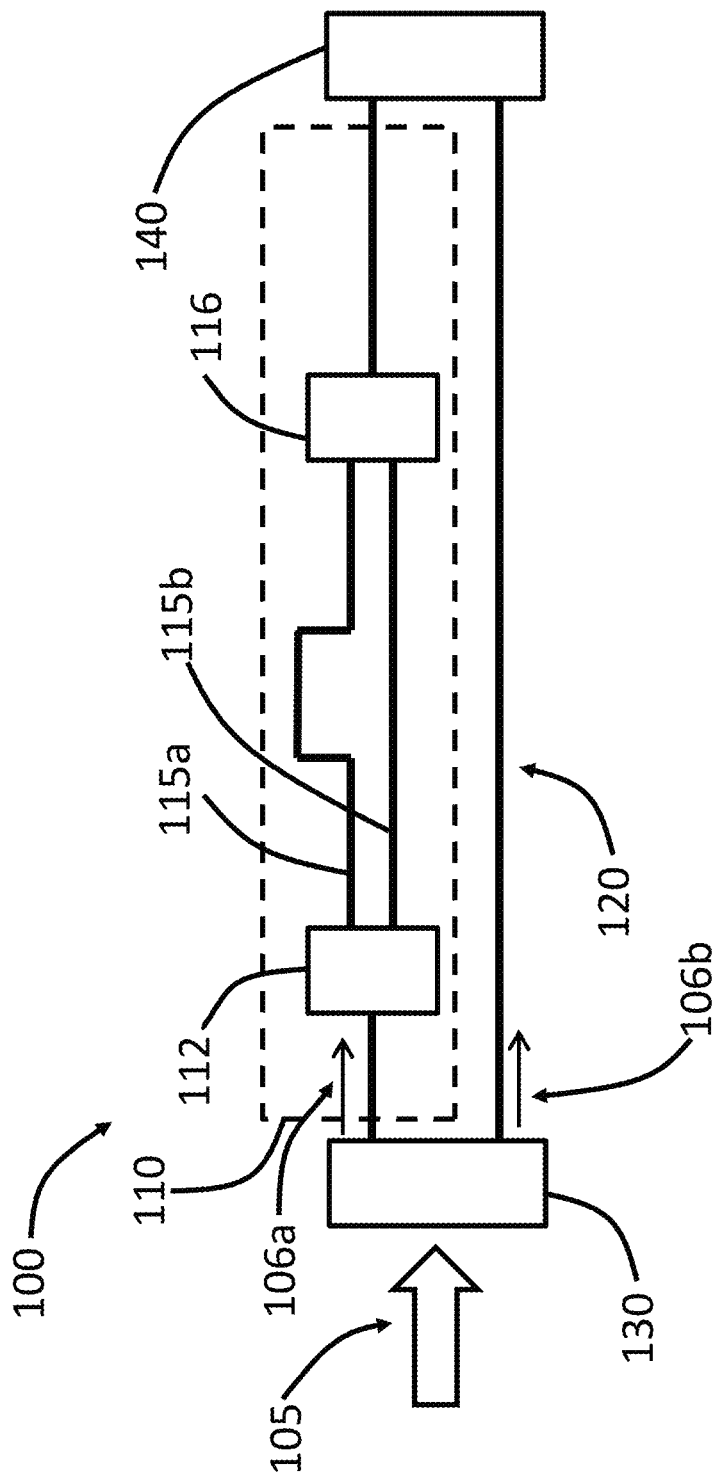
FIG. 1 shows a schematic of a spectrometer including two interference arms and an optical switch to control the optical path length of one of the interference arms.

To increase the tuning range of optical path lengths in spectrometers while maintaining the compactness and low power consumption, apparatus, systems, and methods described herein employ optical switches to change the optical path lengths by directing incident light into waveguides having different lengths. A spectrometer based on this approach includes an interferometer having a first interference arm (also referred to as an interferometer arm or an arm) and a second interference arm to produce interference patterns from incident light, which is to be characterized by the spectrometer. At least one of the interference arms includes a series of cascaded optical switches connected by two (or more) waveguides of different lengths. Each optical switch can direct the incident light into one waveguide or another, thereby changing the optical path length difference between the first interference arm and the second interference arm.

To quantitatively evaluate the advantage of the optical switch approach to tune optical path length differences, a generic FTIR interferometer structure an initial arm length $L_0$ and maximum optical path length difference between the two arms $\Delta L_0$ can be considered. Without being bound by any particular theory or mode of operation, the Rayleigh criterion can be used to estimate the spectral resolution $\Delta v$ (in wave number) by:

$$\Delta v = 1/\Delta L_0 \qquad (1)$$

The corresponding spectral resolution in the wavelength domain is approximated as:

$$\Delta v = \lambda^2/\Delta L_0 \qquad (2)$$

where $\lambda$ is the center wavelength.

In electro-optical tuning or thermos-optical tuning, the induced waveguide effective index change can be denoted as $\Delta n$, and the interferometer arm optical path length change is then $\Delta L_0 = \Delta n \cdot L_0$. As discussed above, the limitations in $\Delta n$ can limit the spectral resolution that can be practically achieved by a conventional spectrometer.

Unlike conventional on-chip Fourier Transform InfraRed (FTIR) spectrometers, this optical switch based approach changes the optical path length difference by directing the incident light into different waveguides having different wavelengths using the cascaded switches. Direct modification of the waveguide path is more effective for changing the optical path length than index modulation because this approach is not limited by the small magnitude of index perturbation $\Delta n$, as indicated by Equations (1) and (2). Components in the spectrometer, such as optical switches, waveguides, and beam combiners, can be fabricated into a single chip using, for example, semiconductor manufacturing techniques. Therefore, this approach is compatible with compact on-chip integration and can therefore offer superior spectral resolution compared to prior on-chip FTIR devices.

The above approach can also be extended to carrying out spectroscopy using multi-mode incident light. In this case, a spectrometer includes a multi-mode waveguide as the input. Incident light from the multi-mode waveguide is transmitted through a mode transformer, which splits the multi-mode incident light into multiple single-mode light beams. Each single-mode light beam is directed to a corresponding single-mode waveguide that is connected to a respective interferometer. The number of interferometers can be equal to the number of single-mode waveguides. The interference arms include a series of cascaded optical switches connected by waveguides of varying lengths. In addition, adjacent interferometers can share interferences arms via optical switches (see, e.g., FIG. 7A below) so as to increase the compactness of the spectrometer.

Spectrometers Including Optical Switches

FIG. 1 shows a schematic of a spectrometer 100 including an optical switch 112 to change the optical path length difference between the two interferences arms 110 and 120 in the spectrometer 100. The spectrometer 100 includes a beam splitter 130 to receive incident light 105 and splits the incident light 105 into a first portion 106a and a second portion 106b. The first portion 106a is directed to the first interference arm 110 and the second portion 106b is directed to the second interference arm 120. The optical switch 112 is switchable between a first state and a second state (e.g., an ON state and an OFF state, a HIGH state and a LOW state, or any other terms used in the art). In one state, the optical switch 112 directs the first portion 106a of the incident light 105 into a variable waveguide 115a having a first optical path length $L_1$. In the other state, the optical switch 112 directs the first portion 106a of the incident light 105 into a reference waveguide 115b having a second optical path length $L_2$, which is different from the first optical path length $L_1$. During the switching of the optical switch 112, the optical path length of the second interference arm 120 can be maintained at a fixed value. Therefore, the switching of the optical switch 112 generates two different optical path length differences between the first interference arm 110 and the second interference arm 120.

The first interference arm 110 also includes an optional beam combiner 116 coupled to the variable waveguide 115a and the reference waveguide 115b to collect the first portion 106a of the incident light 105 from the variable waveguide 115a or the reference waveguide 115b. A detector 140 is used to detect the interference between the first portion 106a of the incident light 105 and the second portion 106b of the incident light 105 at each state of the optical switch 112. In one example, as shown in FIG. 1, the first portion 106a and the second portion 106b are transmitted directly to the detector 140. In another example, a beam combiner (not shown in FIG. 1) can be used to combine the two portions 106a and 106b of the incident light 105 before transmitting them to the detector 140.

The spectrometer 100 can be realized on a variety of platforms. In one example, the spectrometer 100 can be realized on a silicon-on-insulator (SOI) platform. In another example, the spectrometer 100 can be realized on a silicon (oxy)nitride platform. In yet another example, the spectrometer 100 can be realized on a III-V semiconductor platform. In yet another example, the spectrometer 100 can be realized on a sapphire platform. In yet another example, the spectrometer 100 can be realized on a polymer platform. In yet another example, the spectrometer 100 can be realized on a $LiNbO_3$ platform.

Various types of photonic devices can be used to construct the optical switch 112. In one example, the optical switch 112 can include a directional coupler. In another example, the optical switch 112 includes a Mach-Zehnder interferometer (MZI) (see, e.g., FIG. 4B below), where phase shifters are included in each arm of the MZI Input light into the MZI can be delivered out of the MZI through one output port or the other output port by changing the phase settings of the two arms, as understood in the art. The phase tuning can be achieved by electro-optical tuning, magneto-optical tuning, thermo-optical tuning, or any other method known in the art.

In yet another example, the optical switch 112 can include a multi-mode interferometer (MMI), which can include a first input port to receive the input light, a first output port connected to a first waveguide, and a second output port connected to a second waveguide. Changing the refractive index distribution in the first and second waveguides can cause the MMI to output the received light via the first output port or the second output port. More details of optical switches based on MMI can be found in U.S. Pat. No. 6,925,220, entitled "Optical switch using multimode interferometer, and optical demultiplexer," which is hereby incorporated herein by reference in its entirety for all purposes.

In yet another example, the optical switch 112 can include a ring resonator disposed between two waveguides evanescently coupled to the ring resonator. Selection of output waveguide can be achieved by changing the refractive index distribution in the ring resonator and in the two waveguides. More details of optical switches based on ring resonators can be found in U.S. Pat. No. 7,400,798, entitled "Optically controlled photonic switch," which is hereby incorporated herein by reference in its entirety for all purposes.

In yet another example, the optical switch 112 can include a plasmonic switch (e.g., a hybrid plasmonic switch). For example, a plasmonic switch can include a middle waveguide disposed between two side waveguides evanescently coupled to the middle waveguide. The middle waveguide can include a nanometer-thin indium tin oxide (ITO) layer sandwiched inside a Metal Oxide Semiconductor (MOS) structure. Classical optical coupling (e.g., waveguide-to-waveguide) can be enhanced by the deep-subwavelength optical mode of the hybridized plasmons, i.e. the plasmonic MOS mode. The switching functionality can be achieved by changing the imaginary part of the refractive index of the ITO layer by several orders of magnitude, thereby shifting the effective index of the optical mode and altering the modal overlap between neighboring waveguides. More details of hybrid plasmonic switch can be found in U.S. Pat. No. 9,529,158, entitled "Silicon-based, broadband, waveguide-integrated electro-optical switch," which is hereby incorporated herein by reference in its entirety for all purposes.

The variable waveguide 115a and the reference waveguide 115b can be made of various materials, depending on, for example, the material platform. In one example, the variable waveguide 115a and the reference waveguide 115b can include silicon. In another example, the variable waveguide 115a and the reference waveguide 115b can include silicon oxides (e.g., $SiO_2$). In yet another example, the variable waveguide 115a and the reference waveguide 115b can include silicon nitrides (e.g., SiN or $Si_3N_4$). In yet another example, variable waveguide 115a and the reference waveguide 115b can include germanium. In one example, the variable waveguide 115a and the reference waveguide 115b can include the same material. In another example, the variable waveguide 115a and the reference waveguide 115b can include different materials.

The optical path length $L_2$ of the reference waveguide 115b can be about 2 μm to about 1 mm (e.g., about 2 μm, about 5 μm, about 10 μm, about 20 μm, about 50 μm, about 100 μm, about 200 μm, about 500 μm, or about 1 mm, including any values and sub ranges in between). In one example, the optical path length $L_1$ of the variable waveguide 115a can be greater than the length $L_2$ of the reference waveguide 115b. In this case, the ratio of $L_1/L_2$ can be about 0.01 to about 0.9 (e.g., about 0.01, about 0.02, about 0.05, about 0.1, about 0.2, about 0.3, about 0.4, about 0.5, about 0.6, about 0.7, about 0.8, or about 0.9, including any values and sub ranges in between). In another example, the optical path length $L_1$ of the variable waveguide 115a can be less than the length $L_2$ of the reference waveguide 115b. In this case, the ratio of $L_2/L_1$ can be about 0.01 to about 0.9 (e.g., about 0.01, about 0.02, about 0.05, about 0.1, about 0.2, about 0.3, about 0.4, about 0.5, about 0.6, about 0.7, about 0.8, or about 0.9, including any values and sub ranges in between).

The optical path length difference between the variable waveguide 115a and the reference waveguide 115b can be achieved in various ways. For example, the reference waveguide 115b can have a straight shape and the variable waveguide 115a can include a delay section (also referred to as a detour section) so as to have a different length than the length of the reference waveguide 115b. The delay section can include a rectangular detour (shown in FIG. 1), a spiral detour, a zig-zag detour or any other configurations known in the art. Alternatively or additionally, the variable waveguide 115a can include a phase shifter to increase or decrease the optical path length.

The beam combiner 116 in the spectrometer 100 is employed to transmit the first portion 106a of the incident light 105 from either the variable waveguide 115 or the reference waveguide 115b to the detector 140. In one example, the beam combiner 116 can include a directional coupler. In another example, the beam combiner 116 can include a multi-mode interferometer. In yet another example, the beam combiner 116 can include a Y-splitter.

The beam splitter 130 can have similar structures as the beam combiner 116 (e.g., directional coupler, multi-mode interferometer, or Y-splitter), but the input and output ports in these structures can be reversed. For example, the input in a Y-splitter as used in the beam combiner 116 can be used as the output in the beam splitter 130.

The detector 140 can include a charged coupled device (CCD) detector or a complementary metal-oxide-semiconductor (CMOS) detector. In one example, the detector 140 can be monolithically fabricated in or on the substrate where the waveguides (e.g., 115a, 115b) are fabricated. In another example, the detector 140 can be monolithically fabricated from the deposited films where the waveguides are fabricated. In yet another example, the detector 140 can be fabricated on a different platform and then bonded to the two interference arms 110 and 120 (or other components) so as to form the spectrometer 100.

Spectrometers Including Cascades of Optical Switches

Figure 2:
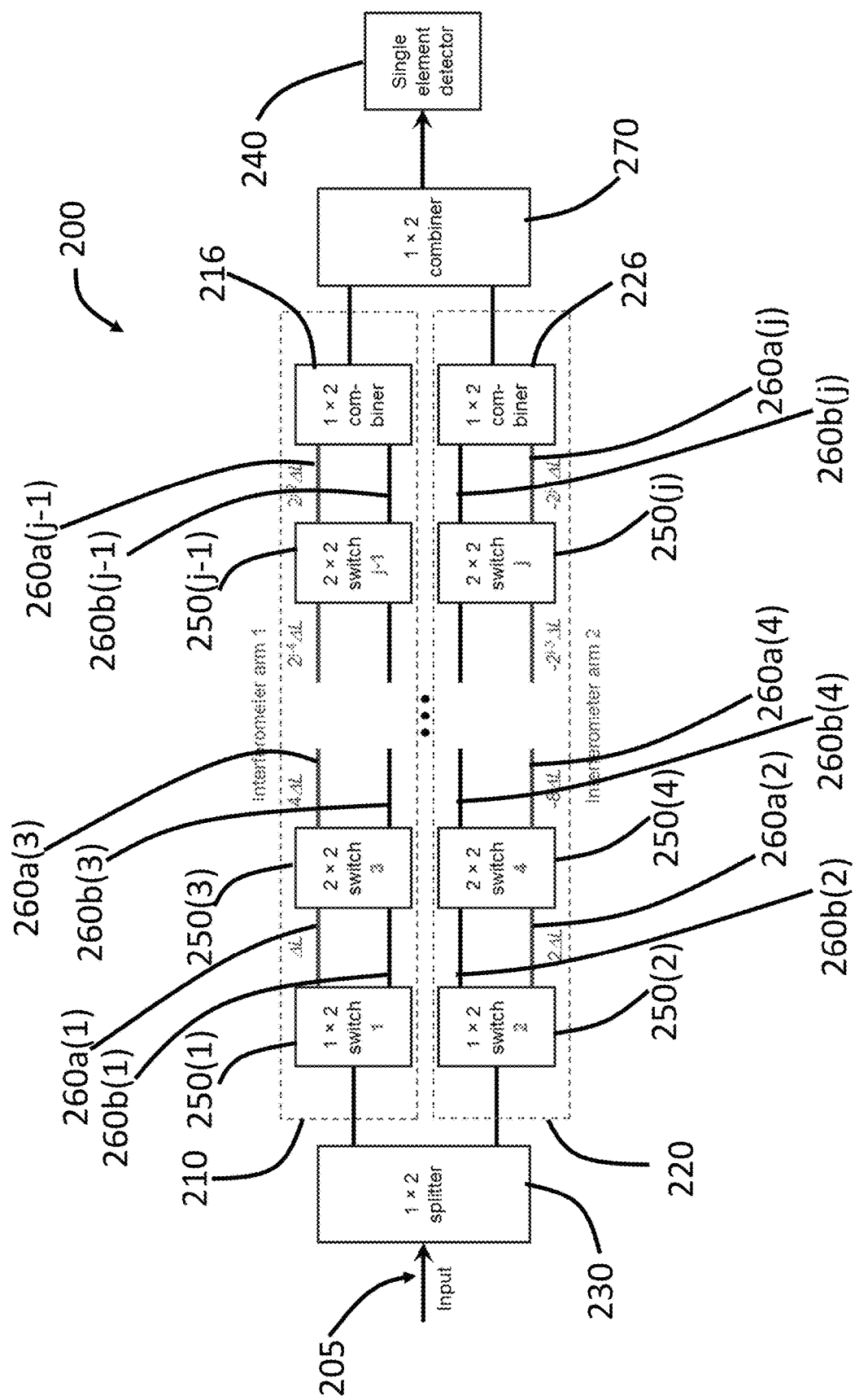
FIG. 2 shows a schematic of a spectrometer including an interferometer with optical switches in both arms.

FIG. 2 shows a schematic of a spectrometer 200 including a cascade of optical switches to increase the tuning range (also referred to as the dynamic range) of optical path length differences. According to Equations (1) and (2), increasing the optical path length differences can increase the resolution of the spectrometer 200. The spectrometer 200 includes a beam splitter 230 to receive incident light 205 and split the incident light into a first portion and a second portion. The first portion is transmitted to a first interference arm 210 and the second portion is transmitted to a second interference arm 220. A beam combiner 270 is coupled to the first interference arm 210 and the second interference arm 220 to receive the first portion of the incident light 205 and the second portion of the incident light. A detector 240 is in optical communication with the beam combiner 270 to detect interference generated by the first portion and second portion of the incident light 205.

The spectrometer 200 includes multiple optical switches 250(1), 250(2), . . . , 250(j) (collectively referred to as the optical switches 260), multiple variable waveguides 260a(1), 260a(2), . . . , 260a(j)(collectively referred to as the variable waveguides 260a), and multiple reference waveguides 260b(1), 260b(2), . . . , 260b(j)(collectively referred to as the variable waveguides 260b). These optical switches 250, variable waveguides 260a, and reference waveguides 260b are distributed in the first interference arm 210 and the second interference arm 220. More specifically, the first interference arm 210 includes a cascade of optical switches, labelled as 250(1), 250(3), . . . , 250(j−1). Adjacent optical switches 250(n) and 250(n+1) in the first interference arm 210 are optically connected by a variable waveguide 260a(n) and a reference waveguide 260b(n), where n=1, 3, . . . , j−1. In one state of the optical switch 250(n), the first portion of the incident light 205 is directed to the variable waveguide 260a(n). In another state of the optical switch 250(n), the first portion of the incident light 205 is directed to the reference waveguide 260b(n). The first interference arm 210 also includes a beam combiner 216 coupled to the variable waveguide 260a(j−1) and the reference waveguide 260b(j−1).

The second interference arm 220 includes a cascade of optical switches, labelled as 250(2), 250(4), . . . , 250(j). Adjacent optical switches 250(m) and 250(m+1) in the second interference arm 220 are optically connected by a variable waveguide 260a(m) and a reference waveguide 260b(m), where m=1, 2, . . . , j−1. In one state of the optical switch 250(m), the second portion of the incident light 205 is directed to the variable waveguide 260a(m). In another state of the optical switch 250(m), the second portion of the incident light 205 is directed to the reference waveguide 260b(m). The second interference arm 220 also includes a beam combiner 226 coupled to the variable waveguide 260a(j) and the reference waveguide 260b(j).

Each pair of variable waveguides 260a(i) and reference waveguides 260b(i), l=1, 2, . . . , j, can have different optical path lengths. Therefore, the switching of each optical switch 250(i) can change the optical path length difference between the first interference arm 210 and the second interference arm 220. The total number of j optical switches 250 provides a total number of $2^j$ different combinations of the states of the optical switches 250. Accordingly, $2^j$ different optical path length differences can be generated.

In general, the optical path length of each variable waveguide 260a(i) and reference waveguide 260b(i), and their difference, can be arbitrarily chosen provided that a desired optical path length difference between the two interferometer arms 210 and 220 can be obtained by the combination of the switching states of the optical switches 250. The desired optical path length difference can be, for example, about 0.5 mm to about 5 mm (e.g., about 0.5 mm, about 1.0 mm, about 1.5 mm, about 2.0 mm, about 2.5 mm, about 3.0 mm, about 3.5 mm, about 4.0 mm, about 4.5 mm, or about 5.0 mm, including any values and sub ranges in between).

In one example, all the reference waveguides 260b can have the same optical path length (denoted as L). The variable waveguides 260a(n) in the first interference arm 210 have optical path lengths greater than L, and the variable waveguides 260a(m) in the second interference arm 220 have optical path lengths less than L. In another example, the reference waveguides 260b can have different optical path lengths (see, e.g., FIG. 5).

In one example, the total length of the reference waveguides 260b(n) in the first interference arm 210 can be the substantially equal to the total length of the reference waveguides 260b(m) in the second interference arm 220. In this case, the optical path including all the reference waveguides 260b(n) in the first interference arm 210 and the optical path including all the reference waveguides 260b(m) in the second interference arm 220 can be used as a starting point for spectroscopy. In another example, the total length of the reference waveguides 260b(n) in the first interference arm 210 can be different from the total length of the reference waveguides 260b(m) in the second interference arm 220.

The numeral i assigned to each optical switch 250(i) is also referred to as the "digit" of the corresponding optical switch 250(i) In one example, the optical path length difference between each pair of variable waveguide 260a(i) and reference waveguide 260b(i) can be $2^{i-1}\Delta L$, where $\Delta L$, is a unit length. In the first interference arm 210, each variable waveguide 260a(i) can be longer than the corresponding reference waveguide 260b(i) by $2^{i-1}\Delta L$, where l=1, 3, . . . , j−1. In contrast, in the second interference arm 220, each variable waveguide 260a(i) can be shorter than the corresponding reference waveguide 260b(i) by $2^{i-1}\Delta L$, where l=2, 4, . . . , j.

This configuration of length variation can achieve high spectral resolution of the spectrometer 200 and can also "digitize" the operation of the spectrometer 200. More specifically, the "off" state of the optical switches 250 (corresponding to the situation when light passes through the reference waveguides 260b) can be labelled with a binary number 0. The "on" state of the optical switches 250 (corresponding to when light passes through the variable waveguides 260a) can be labelled with a binary number 1. In this case, the total length difference between the first interference arm 210 and the second interference arm 220 is given as an integral multiple of $\Delta L$, where the multiplication factor is a j-digit binary number whose digits specify the "on"/"off" states of the switches 250.

For example, j can be 4 with two optical switches in the first interference arm 210 and two optical switches in the second interference arm 220. If the first optical switch 250(1) is on (state "1"), the second 250(2) is off (state "0"), the third 250(3) is on (state "1"), and the fourth 250(4) is off (state "0"), then the corresponding multiplication factor, in binary form, is 1010. This multiplication factor, in decimal form, is 10, i.e. $(1010)_2=(10)_{10}$. The optical path difference between the first interference arm 210 and the second interference arm 220 is therefore $10\Delta L$.

The number of spectral channels (i.e. data points on a spectrograph plotting light intensity as a function of wavelength or wave number) is $2^j$. The maximum arm path length difference is $(2^j-1)\cdot\Delta L$, corresponding to the case when all switches are in the "on" state. Without being bound by any particular theory or mode of operation, the spectral resolution of the spectrometer in this case can be given by:

$$\Delta v = \frac{1}{n\cdot(2^j-1)\cdot\Delta L} \sim \frac{1}{2^j}\cdot\frac{1}{n\cdot\Delta L} \quad (3)$$

The spectral resolution in wavelength can be given by:

$$\delta\lambda \sim \frac{1}{2^j}\frac{\lambda^2}{n_{\text{eff}}\Delta L} \quad (4)$$

Spectral bandwidth in the wavelength domain is:

$$BW = \delta\lambda\cdot N \sim \frac{\lambda^2}{n_{\text{eff}}\Delta L} \quad (5)$$

Equation (3) suggests that performance scaling of the spectrometer 200 can be readily achieved by increasing the total number j of the optical switches 250. In practice, the total number j of the optical switches 250 can be about 2 to about 50 (e.g., about 2, about 5, about 10, about 15, about 20, about 25, about 30, about 35, about 40, about 45, or about 50, including any values and sub ranges in between). In some cases, the total number j can also be greater than 50 to further improve resolution. The total length of the spectrometer 200 can be about 20 µm to about 20 cm (e.g., about 20 µm, about 50 µm, about 100 µm, about 200 µm, about 500 µm, about 1 mm, about 2 mm, about 5 mm, about 1 cm, about 2 cm, about 5 cm, about 10 cm, or about 20 cm).

As discussed above, the optical path length of the reference waveguides 260b can be about 2 µm to about 1 mm. Depending on the number of waveguides, the overall size (e.g., total length) of the spectrometer 200 can be about 0.5 mm to about 10 cm (e.g., about 0.5 mm, about 1 mm, about 2 mm, about 5 mm, about 1 cm, about 2 cm, or about 10 cm, including any values and sub ranges in between).

The spectrometer 200 can further include one or more phase shifters operably coupled to one or more of the variable waveguides 260a and/or the reference waveguides 260b. The phase shifter(s) can perform fine adjustment of optical path difference between the first interference arm 210 and the second interference arm 220, while the optical switches 250 can perform coarse adjustment of the optical path difference between the first interference arm 210 and the second interference arm 220. This combination of phase shifters and optical switches 250 can reduce the step size of the scanning of optical path length differences.

In FIG. 2, the spectrometer 200 has the same number of optical switches 250 in the first interference arm 210 and in the second interference arm 220. In another example, the number of the optical switches 250 in the first interference arm 210 can be different than the number of optical switches in the second interference arm 200.

The optical switches 250 shown in FIG. 2 are either 1×2 optical switches (e.g., 250(1) and 250(2)) or 2×2 optical switches. This approach can be further generalized to M×M switches. Therefore, each optical switch can direct input light into M different waveguides having M different optical path lengths. By choosing varying waveguide lengths between the switches, the resulting spectrometer can include a total number $M^j$ of different optical states and hence in principle can support maximally $M^j$ spectral channels.

Calibration of Spectrometer

The spectrometer 200 is highly tolerant against fabrication errors, such as dimension variations in component cross-sectional or length. To address these fabrication variations, a calibration step can be performed prior to using the spectrometer 200 for spectroscopic interrogations. During the calibration, monochromatic light of unit intensity and at different wavelengths ($\lambda_1, \lambda_2, \ldots, \lambda_N$, where N=$2^j$ is the number of spectral channels) is sequentially launched into the input port of the spectrometer 200 (e.g., the splitter 230). At each wavelength $\lambda_i$ the output intensity of the spectrometer 200 is recorded at each distinctive combination of the switching states (e.g., "on"/"off" states) of the j optical switches 250. Since there are a total of j optical switches 250, there exist $2^j$ distinctive combinations of the switch "on"/"off" states. The resulting calibration data at all wavelengths therefore form a $2^j \times 2^j$ calibration matrix $M_c$. Each column of the matrix $M_c$ gives the transmittance through the spectrometer 200 for a particular wavelength at different switch "on"/"off" state combinations, whereas each row of the matrix $M_c$ specifies the transmittance versus wavelength at a particular "on"/"off" state configuration of the switches 250.

Since the spectrometer 200 usually operates in the linear optics regime, the spectrograph of an arbitrary polychromatic input (e.g., whose spectrum falls within the calibration wavelengths) can be solved as following. First, a vector $I(n)(n=1, 2, \ldots, 2^j)$ can be created by recording the transmittance at all $2^j$ distinctive combinations of the switch "on"/"off" states. Then the vector I(n) can be multiplied with the inverse of the calibration matrix $M_c$ to solve the spectrograph, i.e., spectrograph=$I*M_c^{-1}$.

In addition, once the calibration matrix $M_c$ is acquired, the optical switches 250 can operate without high contrast ratio to solve the spectrograph. As a result, the operation bandwidth of the spectrometer 200 is limited only by the single mode condition of the waveguides (e.g., variable waveguides 360a and reference waveguides 360b) in the spectrometer 200, rather than the operation bandwidth of the optical switches 250 or the beam splitters/combiners (e.g., 230, 270). Furthermore, the calibration matrix $M_c$ can be invariant for a given spectrometer 200 and therefore one calibration step can be used for multiple operations at a given operation wavelength range.

Spectrometers with Improved Signal-to-Noise Ratio

Figure 3:
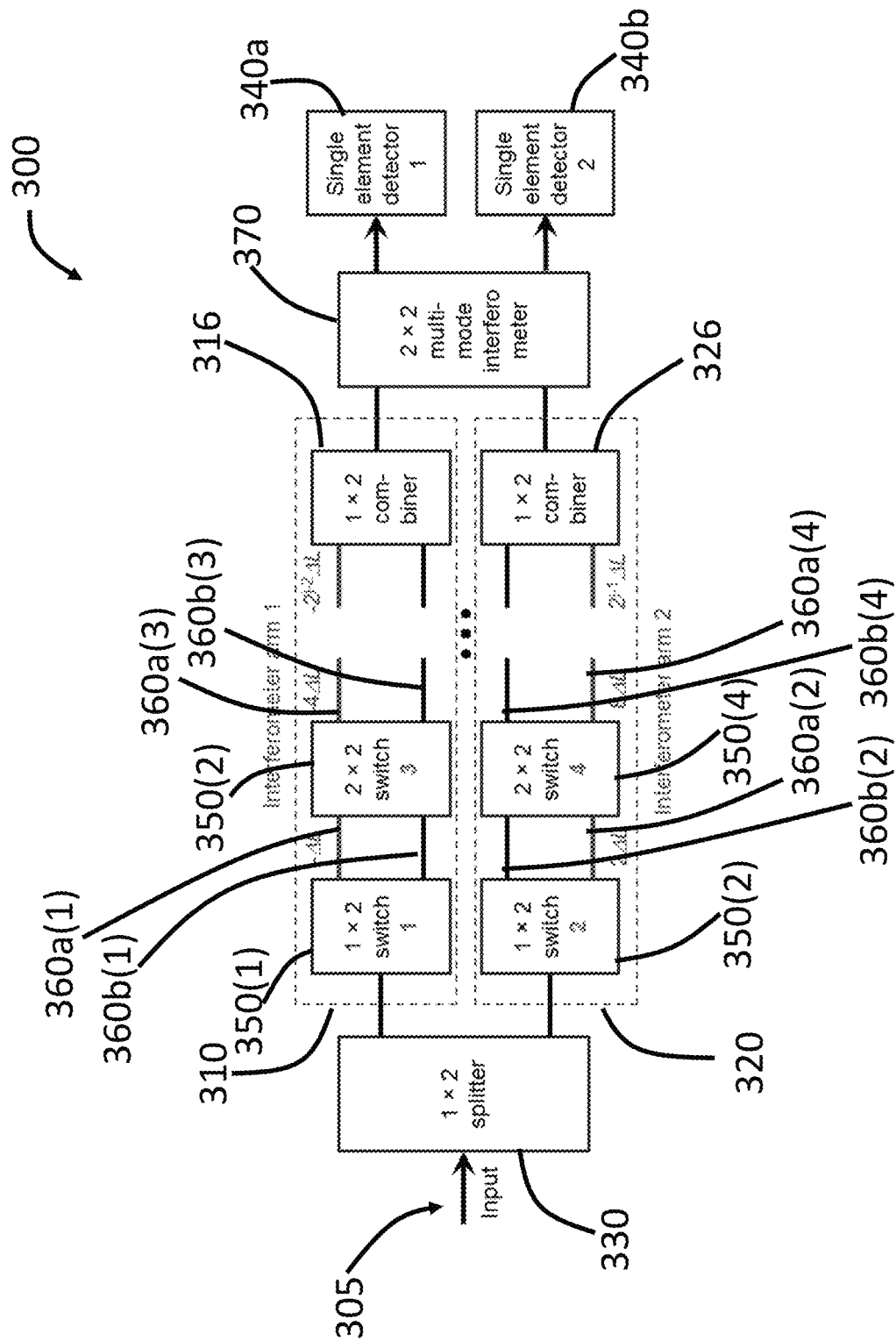
FIG. 3 shows a schematic of a spectrometer including two detectors to increase the signal-to-noise (S/N) ratio.

FIG. 3 shows a schematic of a spectrometer 300 including two detectors 340a and 340b that can improve the signal-to-noise (S/N) ratio of the spectrometer 300. The spectrometer 300 includes a beam splitter 330 to receive incident light 305 and split the incident light into a first portion and a second portion. The first portion is transmitted to a first interference arm 310 and the second portion is transmitted to a second interference arm 320. A beam combiner 370 is coupled to the first interference arm 310 and the second interference arm 320 to receive the first portion of the incident light 305 and the second portion of the incident light 305. Instead of the 2×1 combiner as shown in FIG. 2, the beam combiner 370 is a 2×2 combiner that has two output ports, which deliver a first output to the first detector 340a and a second output to the second detector 340b. For example, the first output can be the in-phase portion of the light from the two arms 310 and 320, and the second output can be the out-of-phase portion of the light from the two arms 310 and 320. The two outputs can provide different information. Combining the information can increase the S/N ratio by a factor of $\sqrt{2}$. For example, linear transform, such as Fourier transform, can be performed on each output (i.e. first output and second output) to obtain respective spectrum (i.e., first spectrum and second spectrum). The two spectra can then be averaged to produce a combined result with improved S/N ratio.

The first interference arm 310 and the second interference arm 320 of the spectrometer 300 can be substantially similar to the first interference arm 210 and the second interference arm 220, respectively, in the spectrometer 200 shown in FIG. 2. Generally, the first interference arm 310 includes optical switches 350(n), variable waveguides 360a(n), and reference waveguide 360b(n), where n=1, 3, ..., j−1. The second interference arm 320 includes optical switches 350(m), variable waveguides 360a(m), and reference waveguide 360b(m), where m=2, 4, ..., j. A first beam combiner 316 is included in the first interference arm 310 to transmit the first portion of the incident light to the beam combiner 370. A second beam combiner 316 is used in the second interference arm 320 to transmit the second portion of the incident light to the beam combiner 370.

Spectrometers Including Mach-Zehnder Interferometers for Optical Switching

Figure 4A:
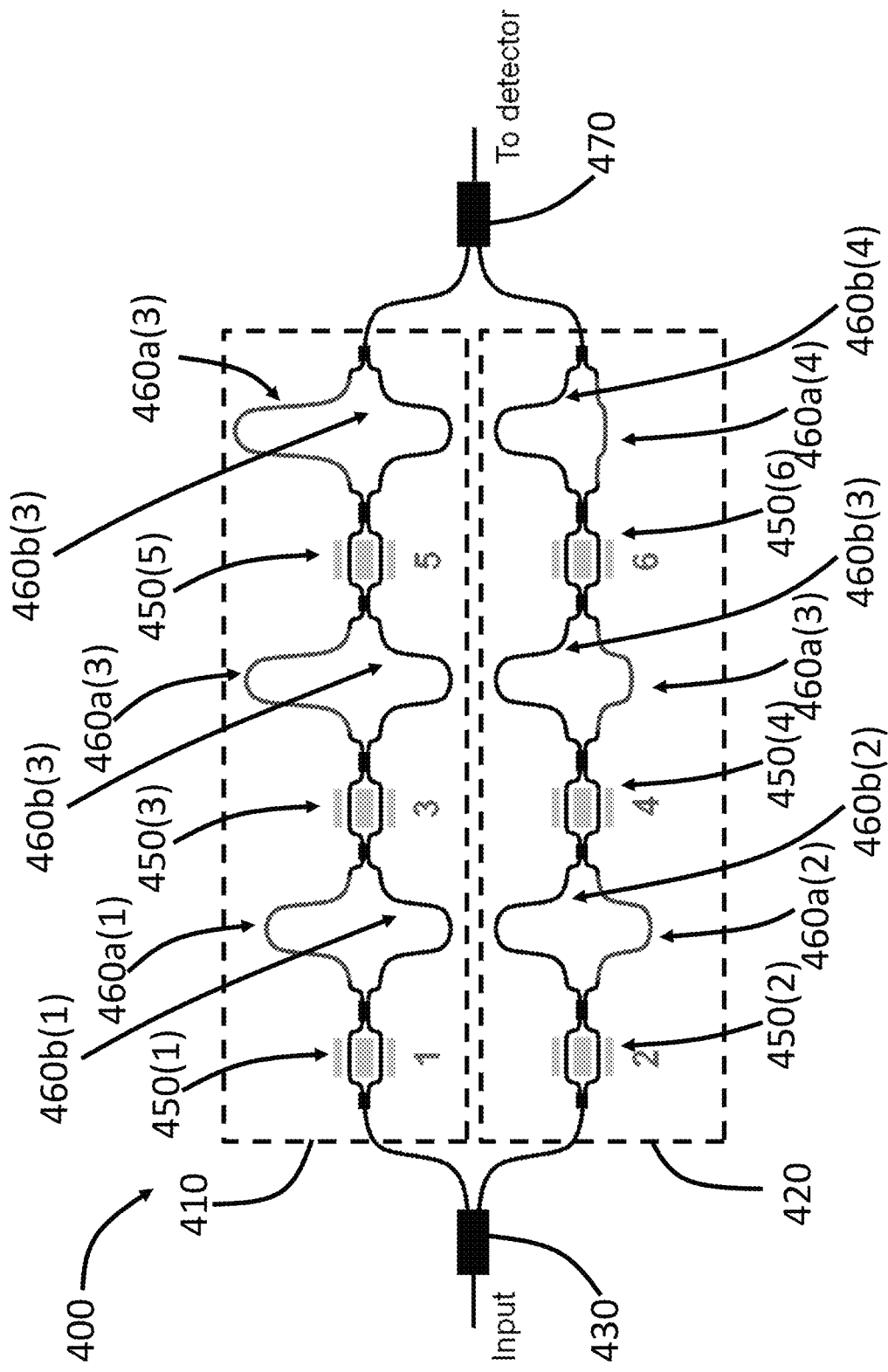
FIG. 4A shows a schematic of a spectrometer using Mach-Zehnder interferometers as optical switches to adjust optical path lengths.
Figure 4B:
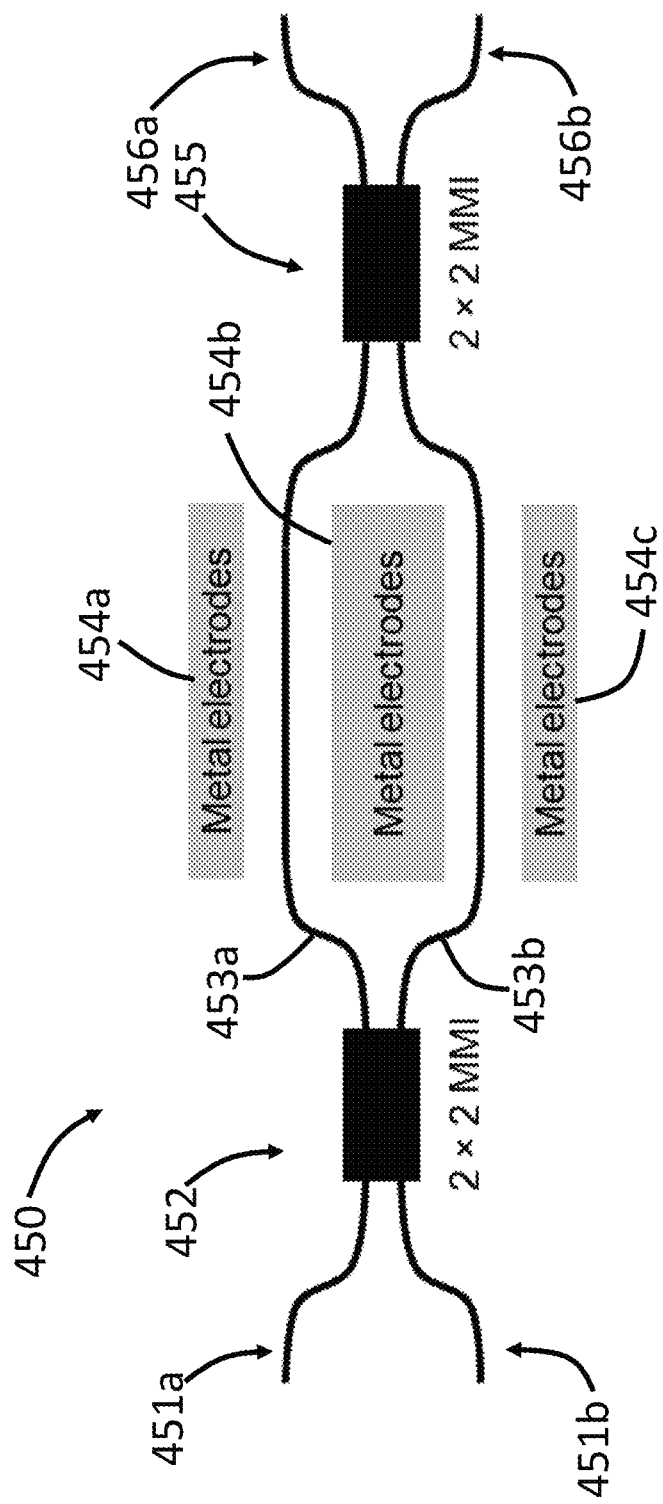
FIG. 4B shows a schematic of an optical switch that can be used in the spectrometer shown in FIG. 4A.

FIG. 4A shows a schematic of a spectrometer 400 including Mach-Zehnder interferometers (MZIs) for optical switching. FIG. 4B shows a schematic of an optical switch 450 that can be used in the spectrometer 400. The spectrometer 400 includes a beam splitter 430 to receive incident light and split the incident light into a first interference arm 410 and a second interference arm 420. The first interference arm 410 includes optical switches 450(1), 450(3), and 450(5). Each of the optical switch 450(n) (n=1, 3, 5) is coupled to a corresponding variable waveguide 460a(n) and a corresponding reference waveguide 460b(n). The second interference arm 420 includes optical switches 450(2), 450(4), and 450(6). Each of the optical switch 450(m) (m=1, 3, 5) is coupled to a corresponding variable waveguide 460a(m) and a corresponding reference waveguide 460b(m). A beam combiner 470 is coupled to the first interference arm 410 and the second interference arm 420 to transmit the incident light to a detector (not shown in FIG. 4).

In FIG. 4A, the variable waveguide 460a(n) (n=1, 3, 5) in the first interference arm 410 is longer than the corresponding reference waveguide 460b(n). In contrast, the variable waveguide 460a(m) (m=2, 4, 6) in the second interference arm 420 is shorter than the corresponding reference waveguide 460b(m). As discussed above, this configuration offers a large tuning range of the optical path difference between the two arms 410 and 420 and therefore achieve high resolution of in the spectrometer 400.

FIG. 4B shows the schematic of the optical switches 450. The optical switch 450 includes a first multi-mode interferometer (MMI) 452 and a second MMI 455 coupled together by a first switch arm 453a and a second switch arm 453b. The first MMI 452 includes two input ports 451a and 451b and two output ports connected to the two switch arms 453a and 453b. The second MMI 455 includes two input ports connected to the two switch arms 453a and 453b and two output ports 456a and 456b. The optical switch 450 also includes three electrodes 454a, 454b, and 454c. The electrodes 454a and 454b are disposed on two sides of the first switch arm 453a, while the electrodes 454b and 454c are disposed on two sides of the second switch arm 453b.

In one example, electrical currents flow through each pair of the electrodes (i.e., 454a and 454b, 454b and 454c) to change the refractive index of the corresponding switch arm (i.e., 453a and 453b, respectively). In another example, each pair of the electrodes (i.e., 454a and 454b, 454b and 454c) can apply an electric field such that the index of corresponding switch arm (453a and 453b, respectively) changes due to electro-optic effects.

Figure 5:
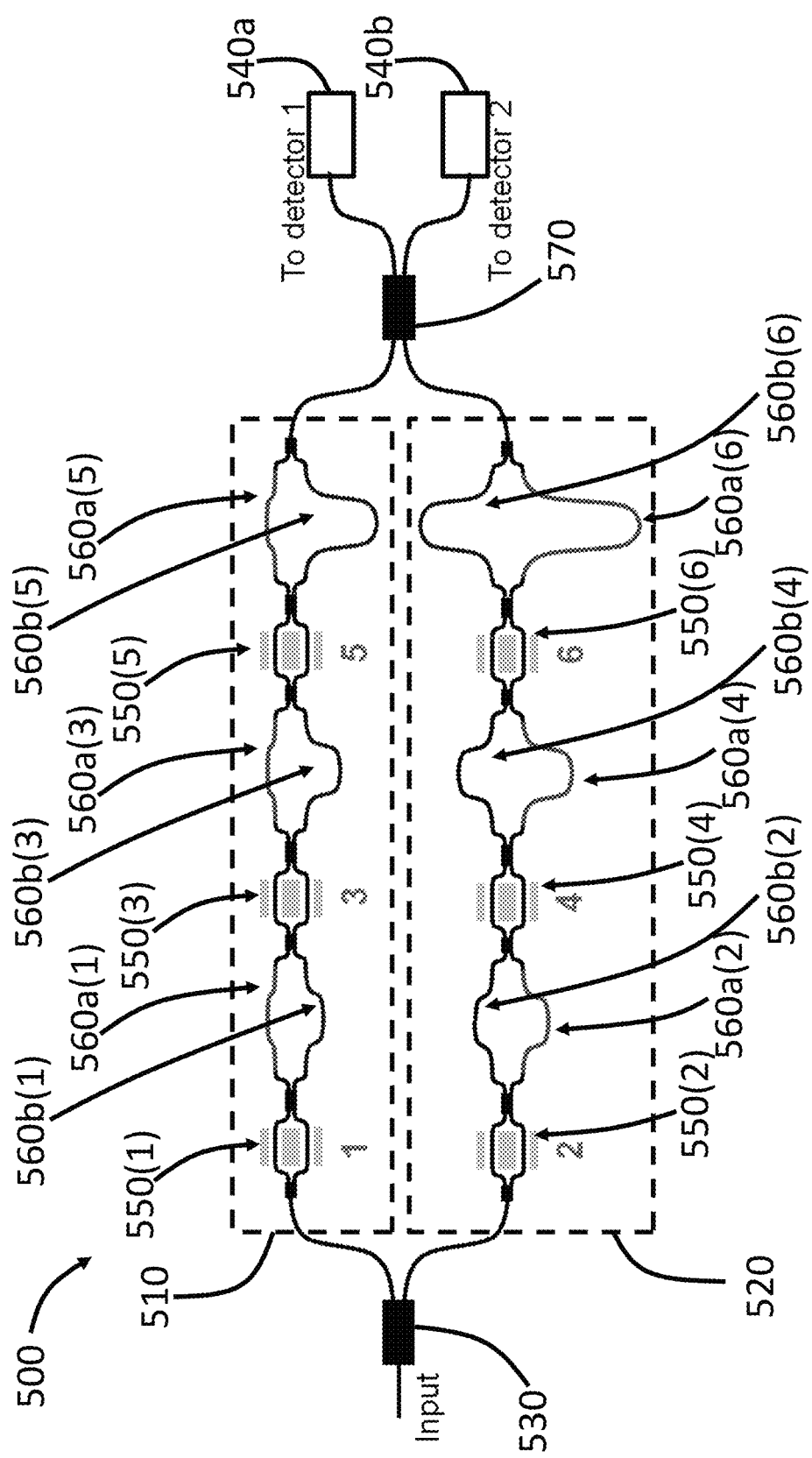
FIG. 5 shows a schematic of a spectrometer using Mach-Zehnder interferometers as optical switches and two detectors to increase the S/N ratio.

FIG. 5 shows a schematic of a spectrometer 500 including MZIs for optical switching and two detectors 540a and 540b for increasing the S/N ratio. The spectrometer 500 includes a beam splitter 530 to receive incident light and split the incident light into a first interference arm 510 and a second interference arm 520. The first interference arm 510 includes optical switches 550(1), 550(3), and 550(5). Each of the optical switch 550(n) (n=1, 3, 5) is coupled to a corresponding variable waveguide 560a(n) and a corresponding reference waveguide 560b(n). The second interference arm 520 includes optical switches 550(2), 550(4), and 550(6). Each of the optical switch 550(m) (m=1, 3, 5) is coupled to a corresponding variable waveguide 560a(m) and a corresponding reference waveguide 560b(m). A 2×2 combiner 570 is employed in the spectrometer 500 to receive the first portion of the incident light from the first interference arm 510 and the second portion of the incident light from the second interference arm 520. The two output ports of the combiner 570 are coupled to the two detectors 540a and 540b. As discussed above, using a 2×2 combiner and two detectors can increase the S/N ratio by $\sqrt{2}$, compared to, for example, the spectrometer 400 shown in FIG. 4A.

In FIG. 5, the arrangement of the optical path length of each waveguide (e.g., 460a and 460b) is also different from the arrangement shown in FIG. 4A. More specifically, in the first interference arm 510, the variable waveguides 560a(1), 560a(3), and 560a(5) have the same optical path length, while the reference waveguides 560b(1), 560b(3), and 560b(5) have different optical path lengths. The length of each of the reference waveguides 560b(1), 560b(3), and 560b(5) in the first interference arm 510 is substantially equal to the reference waveguides 560b(2), 560b(4), and 560b(6), respectively, in the second interference arm. In this arrangement, the total waveguide length that light travels through can be shorter to achieve the same optical path length differences (e.g., compare to the arrangement in FIG. 4A). Therefore, optical losses due to propagation can be reduced.

Performance Scaling of Spectrometers Including Optical Switches

To investigate the scaling behavior of the spectrometers described above, an FTIR device including ridge waveguides and a total of j thermo-optic switches can be considered. The device can be fabricated in a silicon-on-insulator (SOI) platform. Specifications of SOI photonic components used in this analysis are as following. SOI ridge waveguides (e.g., used for the variable waveguides 260a and reference waveguides 260b in FIG. 2) have an insertion lass of about 1.2 dB/cm and a footprint of about 0.5 μm in width and 0.22 μm in height. Thermo-optic phase shifters (e.g., used in optical switches 250) have an insertion loss of about 0.23 dB each and a footprint of about 61.6 μm in length. 1×2 splitters/combiners have an insertion loss of about 0.27 dB and a footprint of about 2 μm in length and 1.2 μm in width. 2×2 splitters/combiners have an insertion loss of about 0.15 dB and a footprint of about 152 μm in length.

The above numbers quoted for devices processed in commercial multi-project-wafer (MPW) runs, which can be representative of state-of-the-art photonic manufacturing in a production-relevant setting. To obtain sub-nm spectral resolution, the maximum path length difference between the two interferometer arms (i.e., $2^j \Delta L$) can be on the order of several millimeters or more. Therefore, the thermo-optic switches and the splitters/combiners may make negligible contributions to the overall device footprint. Each set of two optical switches, such as 250(1) and 250(2) in FIG. 2, form a "stage". The reference waveguides (e.g., 260b) in each "stage" can be constrained by the condition that the shorter arm lengths (e.g., the length of the variable waveguides 260a) are greater than zero.

With the above numbers, the reference arm length (in μm) can be given as:

$$L_{tot} = (\Delta L + 4\Delta L + 16\Delta L + \ldots + 2^{j-2}\Delta L) + \qquad (6)$$
$$\frac{j}{2} \cdot L_{ps} + (j-1) \cdot L_{2\times 2} + 4 \cdot L_{1\times 2} \sim \frac{2^j}{3}\Delta L + j \cdot 182.8 - 144$$

where $L_{PS}$=61.6 μm, $L_{2\times 2}$=152 μm, and $L_{1\times 2}$=2 μm are based on the component specifications listed above.

The total insertion loss (IL, given in dB) can be given as:

$$IL = \frac{j}{2} \cdot IL_{PS} + (j-1) \cdot IL_{2\times 2} + 4 \cdot IL_{1\times 2} + \frac{2^j}{3} \Delta L \cdot IL_{WG} = \quad (7)$$

$$0.265j + 0.97 + \frac{2^j}{3} \Delta L \cdot 1.2 \times 10^{-4}$$

where $IL_{PS}$=0.23 dB, $IL_{2\times 2}$=0.15 dB, $IL_{1\times 2}$=0.28 dB, and $IL_{WG}$=1.2×10$^{-4}$ dB/cm.

A specific example of an on-chip spectrum analyzer covering the entire C and L bands (1530-1625 nm wavelengths) can also be examined. Here the effective refractive index of the waveguides $n_{eff}$=2.55, the operation wavelength $\lambda$=1577.5 nm, and $\Delta L$=10.3 μm.

Figures 6A, 6B, 6C:
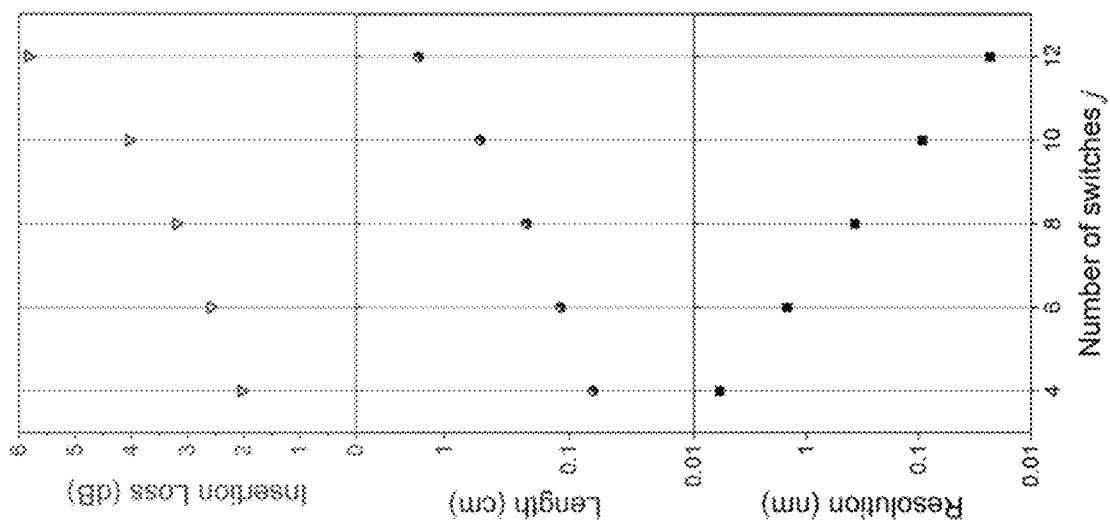
FIGS. 6A-6C show calculated insertion loss, arm length, and resolution, respectively, as a function of the number of optical switches used in a spectrometer.

FIGS. 6A-6C plot the insertion loss, the total length, and the resolution, respectively, of the resulting spectrometer as a function of the number of stages. For example, with 12 stages (i.e., 12 optical switches and therefore $2^{24}$ channels), the bandwidth of the spectrometer BW is about 95 nm, the resolution of the spectrometer δλ is about 0.023 nm, the total insertion loss IL is about 5.8 dB, and the total length $L_{tot}$ is about 1.6 cm. These performance specifications are superior compared to commercial C/L band optical channel monitors.

Spectrometers Including Optical Switches for Multi-Mode

Figure 7A:
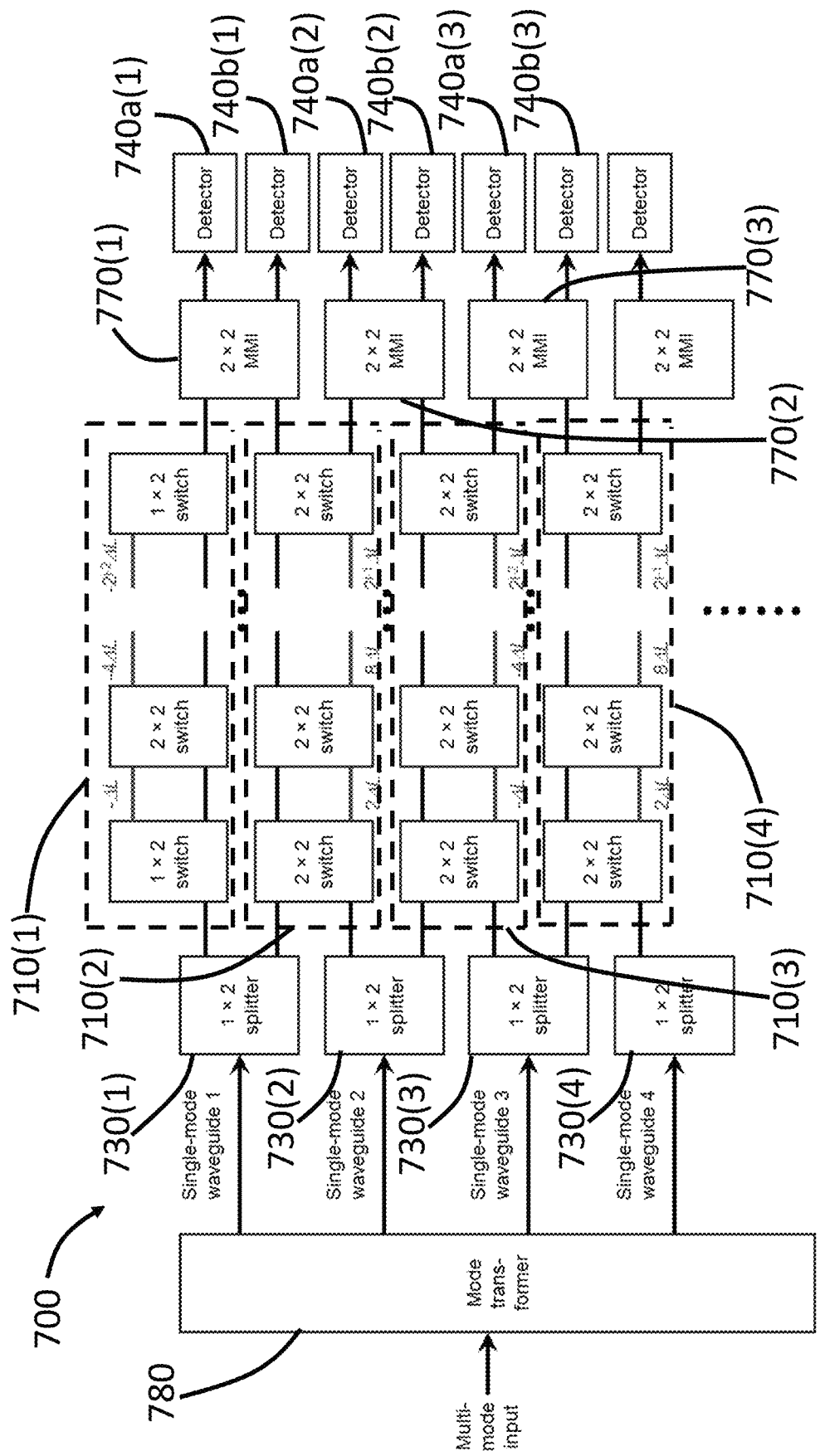
FIG. 7A shows a schematic of a spectrometer including a mode transformer and multiple interferometers for spectroscopy using multi-mode input light.

FIG. 7A shows a schematic of a spectrometer 700 that works with multi-mode input by connecting interferometers in parallel. The spectrometer 700 includes a mode transformer 780 to transform the multi-mode incident light into a multiplicity of single-mode beams. Each single mode beam is directed to a corresponding single mode waveguide coupled to a corresponding beam splitter 730(i), i=1, 2, 3, 4 in FIG. 7. The spectrometer 700 also includes multiple interference arms 710(1) to 710(4). Each of the interference arm includes a cascade of optical switches connected by pairs of variable waveguides and reference waveguides. These interference arms can be substantially similar to the interference arm 210 shown in FIG. 2 and detailed descriptions are not repeated here.

The first single mode beam is directed to the first beam splitter 730(1), which splits the first single mode into two portions, with the first portion coupled into the interference arm 710(1) and the second portion coupled into the interference arm 710(2). A 2×2 beam combiner 770(1) is in optical communication with the two arms 710(1) and 710(2) to collect the two portions of the first single mode beam and transmit the recombined beam to two detectors 740a(1) and 740b(1). In other words, the first beam splitter 730(1), the two interference arms 710(1) and 710(2), the beam combiner 770(1), and the two detectors 740a(1) and 740b(1) form a first interferometer to perform spectroscopy on the first single mode beam split out of the multi-mode incident light.

Similarly, the second beam splitter 730(2), the two interference arms 710(2) and 710(3), the beam combiner 770(2), and the two detectors 740a(2) and 740b(2) form a second interferometer to perform spectroscopy from the second single mode beam split out of the multi-mode incident light. The third beam splitter 730(3), the two interference arms 710(3) and 710(4), the beam combiner 770(3), and the two detectors 740a(3) and 740b(3) form a third interferometer to perform spectroscopy from the third single mode beam split out of the multi-mode incident light.

In the spectrometer 700, adjacent interferometers share one interference arm to maintain the high compactness of the device. For example, the first interferometer and the second interferometer share the interference arm 710(2), and the second interferometer and the third interferometer share the interference arm 710(3).

FIG. 7A shows only four interference arms for illustrative purposes only. In practice, the number of interference arms 710 can depend on the number of spatial modes in the incident light. For example, the number of interference arms 710 can be greater than 10 (e.g., greater than 10, greater than 20, greater than 50, or greater than 100, including any values and sub ranges in between). Using multiple interferometers for multi-mode incident light can improve the system's optical throughput when working with spatially non-coherent sources.

Figure 7B:
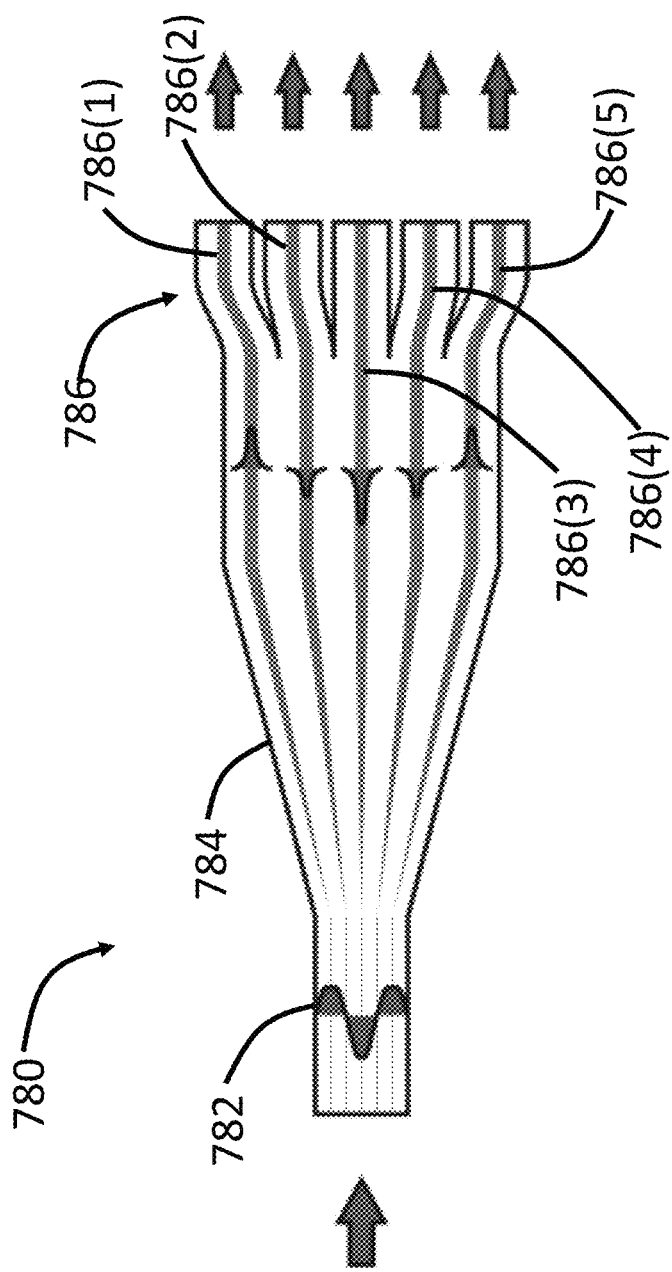
FIG. 7B shows a schematic of a mode transformer that can be used in the spectrometer shown in FIG. 7A.

FIG. 7B shows a schematic of a mode transformer 780 that can be used in the spectrometer 700 shown in FIG. 7A. The mode transformer 780 includes a multi-mode waveguide core 782 to receive the multi-mode incident light. A tapered region 784 is coupled to the multi-mode waveguide core 782 to split each single mode component into a corresponding single mode waveguide core 786(1) to 786(5) (collectively referred to as the single mode region 786). In one example, the single mode region 786 can include separate single-mode fibers (SMFs) fused together to form a single glass body. The tapered region 784 can be generated by stretching or any other methods known in the art. At the end, the tapered region 784 forms a fused multimode fiber (MMF) core. Low-index materials (not shown in FIG. 7B) can be used to surround the multi-mode waveguide core 782 to form a cladding. This configuration is also referred to as photonic lantern. More details of photonic lanterns can be found in Timothy Birks et al., "The photonic lantern," *Advances in Optics and Photonics* 7.2 (2015): 107-167, which is hereby incorporated herein by reference in its entirety for all purposes.

Methods of Spectroscopy Using Optical Switches

Figure 8:
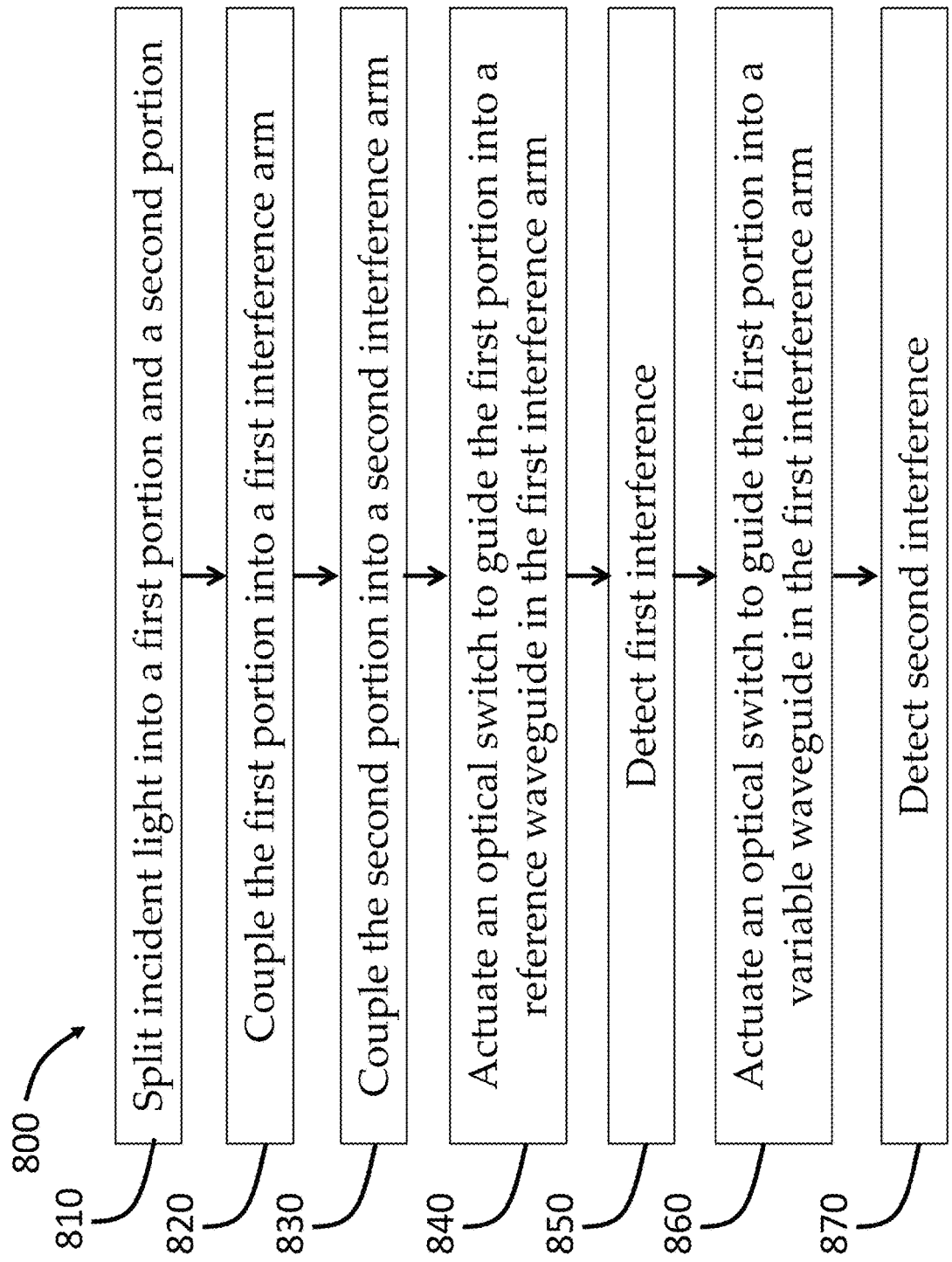
FIG. 8 illustrates a method of spectroscopy using optical switches to scan optical path length differences between two arms of an interferometer.

FIG. 8 illustrates a method 800 of spectroscopy using optical switches. The method 800 includes splitting incident light into a first portion and a second portion, at step 810. The first portion of the incident light is coupled into a first interference arm at step 820. The first interference arm includes a first optical switch, a first reference waveguide having a first optical path length $L_1$, and a first variable waveguide having a second optical path length $L_2$ different than the first optical path length $L_1$. At step 830, the second portion of the incident light is coupled into a second interference arm.

The method 800 also includes two steps of switch actuation 840 and 860. At step 840, the first optical switch is actuated to couple the first portion of the incident light through the first reference waveguide so as to generate a first optical path difference between the first interference arm and the second interference arm. With this first optical path length difference, a first interference between the first portion and second portion of the incident light is detected, at step 850. At step 860, the first optical switch is actuated again to couple the first portion of the incident light through the first variable waveguide so as to generate a second optical path difference between the first interference arm and the second interference arm. The method 800 further includes, at step 870, detecting second interference between the first portion and second portion of the incident light with the second optical path length difference.

The second interference arm can also include a second optical switch and a second pair of variable waveguide and reference waveguide. In this case, the method 800 can include coupling the second portion through the second optical switch. The second optical switched is actuated to propagate the second portion of the incident light through the second reference waveguide having a third optical path length $L_3$. The second optical switch can be actuated again to propagate the second portion of the incident light through a second variable waveguide having a fourth optical path length $L_4$, different than the third optical path length $L_3$. In this case the dynamic range of the optical path difference between the two interference arms is increased.

To further increase the dynamic range of optical path difference, the first interference arm can include $j/2$ optical switches, each of which is coupled to a corresponding variable waveguide and reference waveguide. Accordingly, the method 800 includes coupling the first portion of the incident light through the $j/2$ optical switches (where j is an even integer). The method 800 also includes actuating an nth optical switch in the $j/2$ optical switches to transmit the first portion of the incident light into an nth reference waveguide, where n=1, 2, ..., $j/2$. The method 800 further includes actuating the nth optical switch in the $j/2$ optical switches to transmit the first portion of the incident light into an nth variable waveguide.

Similarly, the second interference arm can also include $j/2$ optical switches, each of which is coupled to a corresponding variable waveguide and reference waveguide. The method 800 further includes coupling the second portion of the incident light through the $j/2$ optical switches, actuating an mth optical switch in the $j/2$ optical switches to transmit the second portion of the incident light into an mth reference waveguide (where m=1, 2, ..., $j/2$), and actuating the mth optical switch in the $j/2$ optical switches to transmit the second portion of the incident light into an mth variable waveguide. At each combination in the $2^j$ switching state configurations of the j optical switches, the corresponding interference of the first portion and second portion of the incident light is detected for further processing to extract spectral information of the incident light.

In some cases, transmitting the first portion of the incident light into the nth variable waveguide includes guiding the first portion of the incident light through an nth variable optical path length. Transmitting the first portion of the incident light into the nth reference waveguide includes guiding the first portion of the incident light through an nth reference optical path length less than the nth variable optical path length. Transmitting the second portion of the incident light into the mth variable waveguide includes guiding the second portion of the incident light through an mth variable optical path length. And transmitting the second portion of the incident light into the mth reference waveguide includes guiding the second portion of the incident light through an mth reference optical path length greater than the mth variable optical path length.

In some cases, transmitting the first portion of the incident light into the nth reference waveguide includes guiding the first portion of the incident light through an optical path length L. Transmitting the first portion of the incident light into the nth variable waveguide includes guiding the first portion of the incident light through an nth variable optical path length $L+2^{2(n-1)}\Delta L$. Transmitting the second portion of the incident light into the mth reference waveguide includes guiding the second portion of the incident light through the optical path length L. And transmitting the second portion of the incident light into the mth variable waveguide includes guiding the second portion of the incident light through $L-2^{2m-1}\Delta L$.

In some cases, the $j/2$ optical switches in the first interference arm and the $j/2$ optical switches define $2^j$ switch settings. The method 800 further includes, for each distinct switch setting in the $2^j$ switch settings, splitting a corresponding monochromatic light beam having a distinct wavelength $\lambda_1$ into a corresponding first portion and a corresponding second portion, where i=1, 2, ..., $2^j$. The corresponding first portion is guided through the first interference arm and the corresponding second portion is guided through the second interference arm. The method 800 further includes detecting interference between the corresponding first portion and the corresponding second portion so as to generate a $2^j \times 2^j$ calibration matrix.

In some cases, the method 800 further includes coupling the first portion of the incident light from the first interference arm through a beam combiner and coupling the second portion of the incident light from the second interference arm through the beam combiner. A first output of the beam combiner is detected using a first detector to generate a first signal and a second output of the beam combiner is detected using a second detector to generate a second signal. The first signal and the second signal are then combined to estimate the spectral information of the incident light.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spectrometer, comprising:
    a beam splitter to split incident light into a first portion and a second portion;
    a first interference arm, in optical communication with the beam splitter, to receive the first portion of the incident light, the first interference arm comprising:
        first optical switches, each first optical switch switchable between a first state and a second state;
        first variable waveguides and first reference waveguides, wherein each first optical switch is coupled to a corresponding first variable waveguide and a corresponding first reference waveguide, each first variable waveguide to receive the first portion of the incident light when its corresponding first optical switch is in its first state, each first reference waveguide to receive the first portion of the incident light when its corresponding first optical switch is in its second state, wherein an optical path length of each first variable waveguide is longer than an optical path length of its corresponding first reference waveguide;
    a second interference arm, in optical communication with the beam splitter, to receive the second portion of the incident light, the second interference arm comprising:
        second optical switches, each second optical switch switchable between a first state and a second state;
        second variable waveguides and second reference waveguides, wherein each second optical switch is coupled to a corresponding second variable waveguide and a corresponding second reference waveguide, each second variable waveguide to receive the second portion of the incident light when its corresponding second optical switch is in its first state, each second reference waveguide to receive the second portion of the incident light when its corresponding second optical switch is in its second state, wherein an optical path length of each second variable waveguide is shorter than an optical path length of its corresponding second reference waveguide; and
    a detector, in optical communication with the first interference arm and the second interference arm, to detect interference of the first portion of the incident light from the first interference arm and the second portion of the incident light from the second interference arm.

2. The spectrometer of claim 1, wherein each first optical switch and each second optical switch is a Mach-Zehnder interferometer (MZI).

3. The spectrometer of claim 1, wherein each first optical switch and each second optical switch includes:
    a first switch arm;
    a second switch arm;
    a first electrode, in electrical communication with the first switch arm, and a second electrode, in electrical communication with the first switch arm and the second switch arm, to modulate a refractive index of the first switch arm; and
    a third electrode, in electrical communication with the second switch arm, to modulate a refractive index of the second switch arm with the second electrode.

4. The spectrometer of claim 3, wherein each first optical switch further includes:
    a first multi-mode interferometer (MMI) including a first input port to receive the first portion of the incident light and a pair of first output ports to output the first portion of the incident light via the pair of first output ports; and a second MMI including a pair of second input ports to receive the first portion of the incident light from the first MMI and a second output port to output the first portion of the incident light, wherein the first switch arm optically couples one of the first output ports to one of the second input ports, and wherein the second switch arm optically couples the other of the first output ports to the other of the second input ports.

5. The spectrometer of claim 3, wherein each second optical switch further includes:

a first multi-mode interferometer (MIMI) including a first input port to receive the second portion of the incident light and a pair of first output ports to output the second portion of the incident light via the pair of first output ports; and a second MMI including a pair of second input ports to receive the second portion of the incident light from the first MMI and a second output port to output the second portion of the incident light, wherein the first switch arm optically couples one of the first output ports to one of the second input ports, and wherein the second switch arm optically couples the other of the first output ports to the other of the second input ports.

6. The spectrometer of claim 1, further comprising a beam combiner coupled to the first interference arm, the second interference arm, and the detector, to transmit the first portion of the incident light from the first interference arm and the second portion of the incident light from the second interference arm to the detector.

7. A method of spectroscopy, the method comprising:

splitting incident light into a first portion and a second portion;

coupling the first portion of the incident light into a first interference arm, the first interference arm including:

first optical switches;

first variable waveguides and first reference waveguides, wherein an optical path length of each first variable waveguide is longer than an optical path length of its corresponding first reference waveguide, the coupling including coupling the first portion of the incident light into each first variable waveguide when its corresponding first optical switch is in a first state, the coupling further including coupling the first portion of the incident light into each first reference waveguide when its corresponding first optical switch is in a second state;

coupling the second portion of the incident light into a second interference arm, the second interference arm including:

second optical switches;

second variable waveguides and second reference waveguides, wherein an optical path length of each second variable waveguide is shorter than an optical path length of its corresponding second reference waveguide, the coupling including coupling the second portion of the incident light into each second variable waveguide when its corresponding second optical switch is in a first state, the coupling further including coupling the second portion of the incident light into each second reference waveguide when its corresponding second optical switch is in a second state;

actuating the first optical switches to couple the first portion of the incident light through at least one of the first variable waveguides, or at least one of the first reference waveguides, or combinations thereof;

actuating the second optical switches to couple the second portion of the incident light through at least one of the second variable waveguides, or at least one of the second reference waveguides, or combinations thereof; and detecting interference between the first portion of the incident light from the first interference arm and the second portion of the incident light from the second interference arm.

8. The method of claim 7, wherein each first optical switch and each second optical switch is a Mach-Zehnder interferometer (MZI).

9. A spectrometer, comprising:

a beam splitter to split incident light into a first portion and a second portion;

a first interference arm, in optical communication with the beam splitter, to receive the first portion of the incident light, the first interference arm comprising:

first optical switches, each first optical switch switchable between a first state and a second state;

first variable waveguides and first reference waveguides, wherein each first optical switch is coupled to a corresponding first variable waveguide and a corresponding first reference waveguide, each first variable waveguide to receive the first portion of the incident light when its corresponding first optical switch is in its first state, each first reference waveguide to receive the first portion of the incident light when its corresponding first optical switch is in its second state, wherein the first variable waveguides have identical optical path lengths and the first reference waveguides have different optical path lengths;

a second interference arm, in optical communication with the beam splitter, to receive the second portion of the incident light, the second interference arm comprising:

second optical switches, each second optical switch switchable between a first state and a second state;

second variable waveguides and second reference waveguides, wherein each second optical switch is coupled to a corresponding second variable waveguide and a corresponding second reference waveguide, each second variable waveguide to receive the second portion of the incident light when its corresponding second optical switch is in its first state, each second reference waveguide to receive the second portion of the incident light when its corresponding second optical switch is in its second state, wherein each second reference waveguide has an optical path length identical to the optical path length of the corresponding first reference waveguide; and a detector in optical communication with the first interference arm and the second interference arm, to detect interference of the first portion of the incident light from the first interference arm and the second portion of the incident light from the second interference arm.

10. The spectrometer of claim 9, wherein each first optical switch and each second optical switch is a Mach-Zehnder interferometer (MZI).

11. The spectrometer of claim 9, wherein each first optical switch and each second optical switch includes:

a first switch arm;

a second switch arm;

a first electrode, in electrical communication with the first switch arm, and a second electrode, in electrical communication with the first switch arm and the second switch arm, to modulate a refractive index of the first switch arm; and a third electrode, in electrical communication with the second switch arm, to modulate a refractive index of the second switch arm with the second electrode.

12. The spectrometer of claim 11, wherein each first optical switch further includes:

a first multi-mode interferometer (MMI) including a first input port to receive the first portion of the incident light and a pair of first output ports to output the first portion of the incident light via the pair of first output ports; and a second MMI including a pair of second input ports to receive the first portion of the incident light from the first MMI and a second output port to output the first portion of the incident light, wherein the first switch arm optically couples one of the first output ports to one of the second input ports, and wherein the second switch arm optically couples the other of the first output ports to the other of the second input ports.

13. The spectrometer of claim 11, wherein each second optical switch further includes:

a first multi-mode interferometer (MMI) including a first input port to receive the second portion of the incident light and a pair of first output ports to output the second portion of the incident light via the pair of first output ports; and a second MMI including a pair of second input ports to receive the second portion of the incident light from the first MMI and a second output port to output the second portion of the incident light, wherein the first switch arm optically couples one of the first output ports to one of the second input ports, and wherein the second switch arm optically couples the other of the first output ports to the other of the second input ports.

14. The spectrometer of claim 9, wherein each first optical switch includes:

a first multi-mode interferometer (MMI) including a first input port and a pair of first output ports, to receive the first portion of the incident light via the first input port and to output the first portion of the incident light via the pair of first output ports;

a second MMI including a pair of second input ports and a second output port, to receive the first portion of the incident light from the first MMI via the pair of second input ports and to output the first portion of the incident light via the second output port;

a first switch arm to optically couple one of the first output ports to one of the second input ports;

a second switch arm to optically couple the other of the first output ports to the other of the second input ports;

a first electrode and a second electrode disposed about the first switch arm to modulate a refractive index of the first switch arm; and a third electrode disposed about the second switch arm along with the second electrode, to modulate a refractive index of the second switch arm.

15. The spectrometer of claim 9, wherein each second first optical switch includes:

a first multi-mode interferometer (MMI) including a first input port and a pair of first output ports, to receive the second portion of the incident light via the first input port and to output the second portion of the incident light via the pair of first output ports;

a second MMI including a pair of second input ports and a second output port, to receive the second portion of the incident light from the first MMI via the pair of second input ports and to output the second portion of the incident light via the second output port;

a first switch arm to optically couple one of the first output ports to one of the second input ports;

a second switch arm to optically couple the other of the first output ports to the other of the second input ports;

a first electrode and a second electrode disposed about the first switch arm to modulate a refractive index of the first switch arm; and a third electrode disposed about the second switch arm along with the second electrode, to modulate a refractive index of the second switch arm.

16. The spectrometer of claim 9, wherein the detector is a first detector, further comprising:

a second detector in optical communication with the first interference arm and the second interference arm; and a beam combiner in optical communication with first interference arm, the second interference arm, the first detector, and the second detector, to:

deliver an in-phase portion of the interference between the first portion of the incident light from the first interference arm and the second portion of the incident light from the second interference arm to the first detector; and deliver an out-of-phase portion of the interference between the first portion of the incident light from the first interference arm and the second portion of the incident light from the second interference arm to the second detector.

17. A method for spectroscopy, comprising:

splitting incident light into a first portion and a second portion;

coupling the first portion of the incident light into a first interference arm, the first interference arm comprising:

first optical switches;

first variable waveguides and first reference waveguides, wherein the first variable waveguides have identical optical path lengths and the first reference waveguides have different optical path lengths, the coupling including coupling the first portion of the incident light into each first variable waveguide when its corresponding first optical switch is in a first state, the coupling further including coupling the first portion of the incident light into each first reference waveguide when its corresponding first optical switch is in a second state;

coupling the second portion of the incident light into a second interference arm, the second interference arm comprising:

second optical switches;

second variable waveguides and second reference waveguides, wherein each second reference waveguide has an optical path length identical to the optical path length of the corresponding first reference waveguide, the coupling including coupling the second portion of the incident light into each second variable waveguide when its corresponding second optical switch is in a first state, the coupling further including coupling the second portion of the incident light into each second reference waveguide when its corresponding second optical switch is in a second state; and actuating the first optical switches to couple the first portion of the incident light through at least one of the first variable waveguides, or at least one of the first reference waveguides, or combinations thereof;

actuating the second optical switches to couple the second portion of the incident light through at least one of the second variable waveguides, or at least one of the second reference waveguides, or combinations thereof; and detecting interference between the first portion of the incident light from the first interference arm and the second portion of the incident light from the second interference arm.

18. The method of claim 17, wherein each first optical switch and each second optical switch is a Mach-Zehnder interferometer (MZI).

19. The method of claim 17, wherein the detecting includes detecting an in-phase portion of the interference between the first portion of the incident light from the first interference arm and the second portion of the incident light from the second interference arm, the method further comprising:

detecting an out-of-phase portion of the interference between the first portion of the incident light from the first interference arm and the second portion of the incident light from the second interference arm.

* * * * *